US009838168B2

(12) United States Patent
Li et al.

(10) Patent No.: US 9,838,168 B2
(45) Date of Patent: Dec. 5, 2017

(54) HIGH-EFFICIENCY WIRELESS PREAMBLE STRUCTURES WITH EFFICIENT TAIL BITS

(71) Applicant: Intel IP Corporation, Santa Clara, CA (US)

(72) Inventors: Qinghua Li, San Ramon, CA (US); Xiaogang Chen, Beijing (CN); Yuan Zhu, Beijing (CN); Yushu Zhang, Beijing (CN); Xintian E. Lin, Mountain View, CA (US); Hujun Yin, Saratoga, CA (US)

(73) Assignee: Intel IP Corporation, Santa Clara, CA (US)

( * ) Notice: Subject to any disclaimer, the term of this patent is extended or adjusted under 35 U.S.C. 154(b) by 31 days.

(21) Appl. No.: 14/757,860

(22) Filed: Dec. 26, 2015

(65) Prior Publication Data
US 2016/0329999 A1  Nov. 10, 2016

Related U.S. Application Data

(60) Provisional application No. 62/157,070, filed on May 5, 2015, provisional application No. 62/157,318, filed on May 5, 2015.

(51) Int. Cl.
H04K 1/10       (2006.01)
H04L 27/28      (2006.01)
(Continued)

(52) U.S. Cl.
CPC .......... *H04L 5/0007* (2013.01); *H04L 5/0044* (2013.01); *H04L 5/0053* (2013.01);
(Continued)

(58) Field of Classification Search
CPC .... H04W 72/04; H04B 7/0452; H04L 5/0007; H04L 5/0044; H04L 5/0053; H04L 27/2613
See application file for complete search history.

(56) References Cited

U.S. PATENT DOCUMENTS

2010/0260159 A1* 10/2010 Zhang ................... H04W 28/06
                                                        370/338
2010/0296596 A1* 11/2010 Miyamoto ............ H04L 5/0007
                                                        375/260

(Continued)

*Primary Examiner* — Shuwang Liu
*Assistant Examiner* — Sung Ahn
(74) *Attorney, Agent, or Firm* — Eversheds Sutherland (US) LLP

(57) ABSTRACT

This disclosure describes systems, methods, computer readable media, and/or apparatus related to encoding wireless communication preamble structures with cyclic redundancy check (CRC) that is performed on both a common part, as well as, station specific parts of a signaling field. The signaling field generated by this mechanism may be relatively shorter, resulting in less preamble overhead, than if a separate CRC was to be provided for each of the station specific parts, as well as the common part of the signaling field. In additional embodiments, tail bits may be provided for a combination of the common part of the signaling field and each station specific part of the signaling field. Compared to providing tail bits separately for the common part and each of the station specific parts, removing the tail bits from the common part may result in relatively less overhead of the preamble structure.

18 Claims, 12 Drawing Sheets

(51) Int. Cl.
*H04L 5/00* (2006.01)
*H04W 84/12* (2009.01)
*H04W 88/02* (2009.01)
*H04W 88/08* (2009.01)

(52) U.S. Cl.
CPC ............ *H04W 84/12* (2013.01); *H04W 88/02* (2013.01); *H04W 88/08* (2013.01)

(56) References Cited

U.S. PATENT DOCUMENTS

| | | | |
|---|---|---|---|
| 2013/0070642 A1* | 3/2013 | Kim | H04W 72/0413 370/254 |
| 2013/0170411 A1* | 7/2013 | Vermani | H04L 1/0001 370/310 |
| 2013/0229996 A1* | 9/2013 | Wang | H04W 72/0413 370/329 |
| 2013/0336306 A1* | 12/2013 | Sohn | H04B 7/0877 370/338 |
| 2014/0307650 A1* | 10/2014 | Vermani | H04L 5/0044 370/329 |
| 2014/0369276 A1* | 12/2014 | Porat | H04L 5/003 370/329 |
| 2015/0009894 A1* | 1/2015 | Vermani | H04L 1/0072 370/328 |
| 2016/0150505 A1* | 5/2016 | Hedayat | H04W 72/1289 370/329 |

* cited by examiner

HIGH-EFFICIENCY WIRELESS PREAMBLE STRUCTURES WITH EFFICIENT TAIL BITS

CROSS-REFERENCE TO RELATED APPLICATIONS

This application claims the benefit of U.S. Provisional Application No. 62/157,070, filed May 5, 2015, and U.S. Provisional Application No. 62/157,318, also filed May 5, 2015.

TECHNICAL FIELD

This disclosure generally pertains to high efficiency wireless transmissions and, more particularly, to high efficiency wireless with efficient preamble structures.

BACKGROUND

With increasing adoption of wireless technology, such as technologies specified by the Institute of Electrical and Electronic Engineers (IEEE) 802.11 standards, there is a greater need for high bandwidth, high throughput, and reliable wireless communication performance. Next generation Wireless Local Area Networks (WLANs) may be based on High-Efficiency WLAN (HEW) utilizing Orthogonal Frequency-Division Multiple Access (OFDMA) resources that are to be allocated to various stations or user devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

Figure 1:
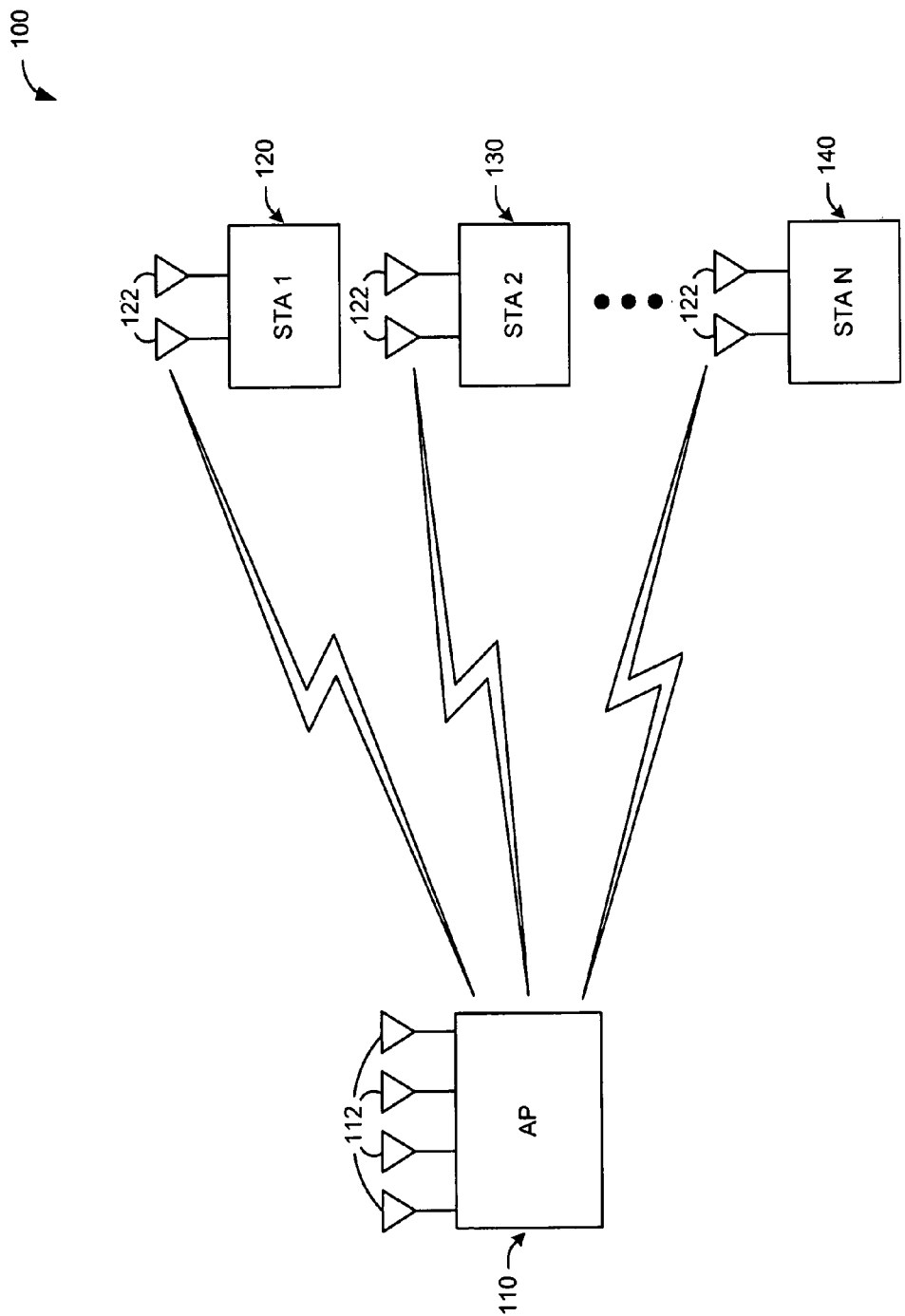
FIG. 1 depicts a simplified schematic diagram of an example environment with an example wireless communication access point (AP) and station devices (STA), in accordance with example embodiments of the disclosure.

The detailed description is set forth with reference to the accompanying drawings, which are not necessarily drawn to scale. The use of the same reference numbers in different figures indicates similar or identical items. Illustrative embodiments will now be described more fully hereinafter with reference to the accompanying drawings, in which some, but not all embodiments of the disclosure are shown. The disclosure may be embodied in many different forms and should not be construed as limited to the embodiments set forth herein; rather, these embodiments are provided so that this disclosure will satisfy applicable legal requirements.

DETAILED DESCRIPTION

Example embodiments described herein provide certain systems, methods, and devices, for providing signaling information to Wi-Fi devices in various Wi-Fi networks, including, but not limited to, IEEE 802.11ax, or modifications thereof.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The term "access point" (AP) as used herein may be a fixed station. An access point may also be referred to as an access node, a base station or some other similar terminology known in the art. An access terminal may also be called a mobile station, user equipment (UE), a user device, a station (STA), a wireless communication device, and/or some other similar terminology known in the art. Embodiments disclosed herein generally pertain to wireless networks. Some embodiments may relate to wireless networks that operate in accordance with one of the IEEE 802.11 standards including the IEEE 802.11 ax standard.

The STAs may be identified by the AP by any variety of handshaking procedures, such as procedures involving the broadcast of beacons from the AP and/or a request for connection by the STAs, etc. The AP may allocate a partial access identification (PAID) or a station identification (STAID) to each of the STAs during the handshaking procedure. The AP may then allocate frequency and/or temporal resources to the STAs with which it is to communicate. The AP may provide an indication of a frequency and/or spatial resource unit (RU) to each of the STAs with which the AP is to communicate and provide WLAN services. The AP and the STAs may be configured to communicate in any variety of modes, such as orthogonal frequency division multiple access (OFDMA) mode, single user mode, and/or multi-user multi-input multi-output (MU-MIMO) mode.

The RUs, in example embodiments, may be a collection of tones within a channel (e.g., partitions of the total bandwidth of the channel). As a non-limiting example, a 20 MHz channel may be divided into 256 tones, 242 of which may be used for data transmission and/or reception. As another non-limiting example, a 40 MHz channel may be divided into 512 tones, 484 of which may be used for data transmission and/or reception. As yet another non-limiting example, a 80 MHz channel may be divided into 1024 tones, 968 of which may be used for data transmission and/or reception. It will be appreciated that there may be any suitable channel bandwidth and number of tones in accordance with example embodiments of the disclosure and that the disclosure is not limited to the examples discussed herein. A RU may have any variety of size in the frequency domain. For example a minimum sized RU may include 26 tones. Other RUs may have 52 tones, 104 tones, 208 tones, 416 tones, or the like.

In some other example embodiments, particularly in MU-MIMO mode a channel may be divided into larger frequency blocks. For example, in MU-MIMO mode multi-user partitions may be 20 MHz sub-channels or greater. In this case, a 20 MHz channel may not be subdivided into sub-units and thus, there may only be a single 20 MHz block or MU partition. For a 40 MHz channel operating in MU-MIMO mode, there may be an option of two 20 MHz MU partitions or a single 40 MHz MU partitions. Further still, in an 80 MHz channel there may be four 20 MHz MU partitions, two 40 MHz MU partitions, one 80 MHz MU partition, or one 40 MHz MU partition with two 20 MHz MU partitions.

In example embodiments, an AP may be configured to communicate resource allocation (e.g., resource units, tones, multi-user (MU) partitions, streams, etc.) to one or more STAs. Communicating this information may be performed by generating a physical layer convergence protocol (PLCP) protocol data unit (PPDU) with a preamble that encodes the resource allocation information pertaining to the one or more STAs with which the AP communicates. The preamble may include a variety of data fields, including a high efficiency wireless signal B (HE-SIG-B) field. This HE-SIG-B field in some cases may have only a STA specific part that pertains only to each of the one or more STAs with which the AP communicates. In other cases, the HE-SIG-B field may have a common part that is relevant to all of the STAs with which the AP communicates and a STA specific part that is partitioned with each partition corresponding to a particular one of the one or more STAs with which the AP is to communicate. In either case, the preamble of the PPDU, and particularly the HE-SIG-B field therein may carry resource allocation information for the one or more STAs with which the AP is to communicate and offer WLAN service. The common part may be also referred to as common field or common block. The STA specific part may include one or more user-specific blocks (or fields). Each user-specific block (or field) may include one user's, two users', or more than two users' specific information, which is referred to as a user-specific subfield. In some embodiments, one user's or two users' specific information can be grouped together. The one user's or two users' specific information can share one CRC and are can be encoded into one codeword; each codeword can include multiple code bits.

According to example embodiments of the disclosure, the resource allocation information that is communicated to each of the STAs may have cyclic redundancy check (CRC) bits to provide an indication of whether the code bits to be received by any of the STAs are received error-free. Thus a CRC may be generated by the AP and transmitted as part of the PPDU preamble to indicate to a particular STA that the relevant information in the preamble code bits are received by that STA in an error-free state. Indeed, if the preamble and/or HE-SIG-B code bits are received in an error free state, then the STA may use the information encoded within the preamble and/or the HE-SIG-B for at least the purposes of determining resources allocated to it. On the other hand, if the CRC indicates any type of error in the preamble and/or HE-SIG-B code bits received by a STA, then that STA may identify that the information encoded in the received code bits may not be reliable. At this point, in example embodiments, the STA may wait for and/or request a retransmission of the preamble containing resource allocation information.

In example embodiments, the CRC bits may be determined by the AP for a combination of the STA specific code bits in the HE-SIG-B for each of the STAs, along with the code bits of the common part of the HE-SIG-B. In some aspects, the STA specific code bits can comprise encoded information bits. In other embodiments, the STA specific code bits can comprise decoded information bits. In this way, an individual CRC need not be performed just for the common part of the HE-SIG-B. As a result fewer bits may need to be incorporated in the HE-SIG-B and the preamble in general. Thus, by performing a CRC for a combination of the common part code bits along with the STA specific code bits, the HE-SIG-B and the preamble may be more efficient, and therefore reduce the amount of overhead associated with communicating resource allocations to each of the STAs.

In further example embodiments, the code bits for the preamble and particularly the HE-SIG-B may be encoded using a convolution code. This encoding may include tail bits for indicating that a particular block of code bits have ended. The code bits of the tail bits may serve as reset bits to a decoder (e.g., Veterbi decoder, etc.) at a STA to reset the decoder to an initial state. It will be appreciated that tail-biting convolution coding may be more efficient than other mechanisms for fixing the state of the decoder at the end of a transmission, such as convolution zero tail codes. Thus, it may be desirable to use tail bits in the transmission of the preamble, and particularly the HE-SIG-B field. As discussed above, the HE-SIG-B field may have a common part that is relevant to all of the STAs with which the AP may interact and a STA specific part that is relevant individually to each of the STAs with which the AP may interact. The STA specific part may be also referred to as STA specific block (or field) or user-specific block (or field). Each user-specific block (or field) can have information specific for one, two, or more STAs. Each user-specific block (or field) may be encoded into one codeword. Each user-specific block (or field) may have one CRC for validation. Therefore, tail bits may be needed at the end of the code bits of each user-specific part incorporated in the STA specific part of the HE-SIG-B. In example embodiments, the tail bits may be determined based at least in part on the common part of the HE-SIG-B and each of the user-specific blocks corresponding to each group of the STAs. In this way, the common part may not have a tail bits and the tail bits for each of the STA specific blocks may be based on the common part along with the STA specific part. As a result, a more efficient encoding of the code bits along with the tail bits may be achieved than if the common part was to have its own tail bits to reset a decoder.

FIG. 1 depicts a simplified schematic diagram of an example environment 100 with an example wireless communication access point (AP) 110 and station devices (STA) 120, 130, 140, in accordance with example embodiments of the disclosure. The stations (STAs) may include any suitable station, such as STA 1 120, STA 2 130, all the way to STA N 140, which may be configured to communicate in accordance with WiFi and/or IEEE 802.11 communication standards, including IEEE 802.11ax or modifications thereto. The AP 110 may also be configured to communicate in accordance with WiFi and/or IEEE 802.11 communication standards, including IEEE 802.11ax or modifications thereto. The STAs 120, 130, 140 may be mobile stations, mobile devices, user devices, and/or the like that are non-stationary and do not have fixed locations, and/or other types of computing devices. In other example embodiments, the STAs 120, 130, 140 may be stationary. The AP may be stationary and have fixed locations in some example embodiments. In other example embodiments, the AP may be non-stationary. The AP 110, in some example embodiments, may be configured to communicate with the STAs 120, 130, 140 and provide the STAs 120, 130, 140 with WLAN services.

In accordance with some IEEE 802.11ax (High-Efficiency WLAN (HEW)) embodiments, the AP 110 may operate as a master station which may be configured to schedule access to a wireless medium for an HEW control period. The AP 110, as the master station may transmit an HEW master-sync transmission at the beginning of the HEW control period. During the HEW control period, HEW stations may communicate with the master station in accordance with a non-contention based multiple access technique. This is unlike conventional Wi-Fi communications in which devices communicate in accordance with a contention-based communication technique, rather than a multiple access technique. During the HEW control period, the master station may communicate with HEW stations using one or more HEW frames. Furthermore, during the HEW control period, legacy stations refrain from communicating. In some embodiments, the master-sync transmission may be referred to as an HEW control and schedule transmission.

In some embodiments, the multiple-access technique used during the HEW control period may be a scheduled orthogonal frequency division multiple access (OFDMA) technique, although this is not a requirement. In other embodiments, the multiple access technique may be a time-division multiple access (TDMA) technique or a frequency division multiple access (FDMA) technique. In certain embodiments, the multiple access technique, may be a space-division multiple access (SDMA) technique. The AP 110 may be configured to operate in a variety of modes, such as orthogonal frequency division multiple access (OFDMA) mode, single user mode, and/or multi-user multi-input multi-output (MU-MIMO) mode.

One or more illustrative STAs 120, 130, 140 may be operable by one or more users (not shown). The STAs 120, 130, 140 may include any suitable processor-driven user device including, but not limited to, a desktop computing device, a laptop computing device, a server, a router, a switch, a smartphone, a tablet, wearable wireless device (e.g., bracelet, watch, glasses, ring, etc.) and so forth.

The AP 110 may be configured to communicate may connected to and/or provide connectivity to the STAs 120, 130, 140 to one or more communications networks, either wirelessly or wired. Any of the communications networks may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks may have any suitable communication range associated therewith and may include, for example, global networks (e.g., the Internet), metropolitan area networks (MANs), wide area networks (WANs), local area networks (LANs), or personal area networks (PANs). In addition, any of the communications networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the STAs 120, 130, 140 and the AP 110 may include one or more communications antennas 112, 122. For example the AP 110 may include communications antennas 112 and the STAs may include communications antennas 122. Communications antenna 112, 122 may be any suitable type of antenna corresponding to the communications protocols used by the STAs 120, 130, 140 and/or the AP 110. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the STAs 120, 130, 140.

Figure 2:
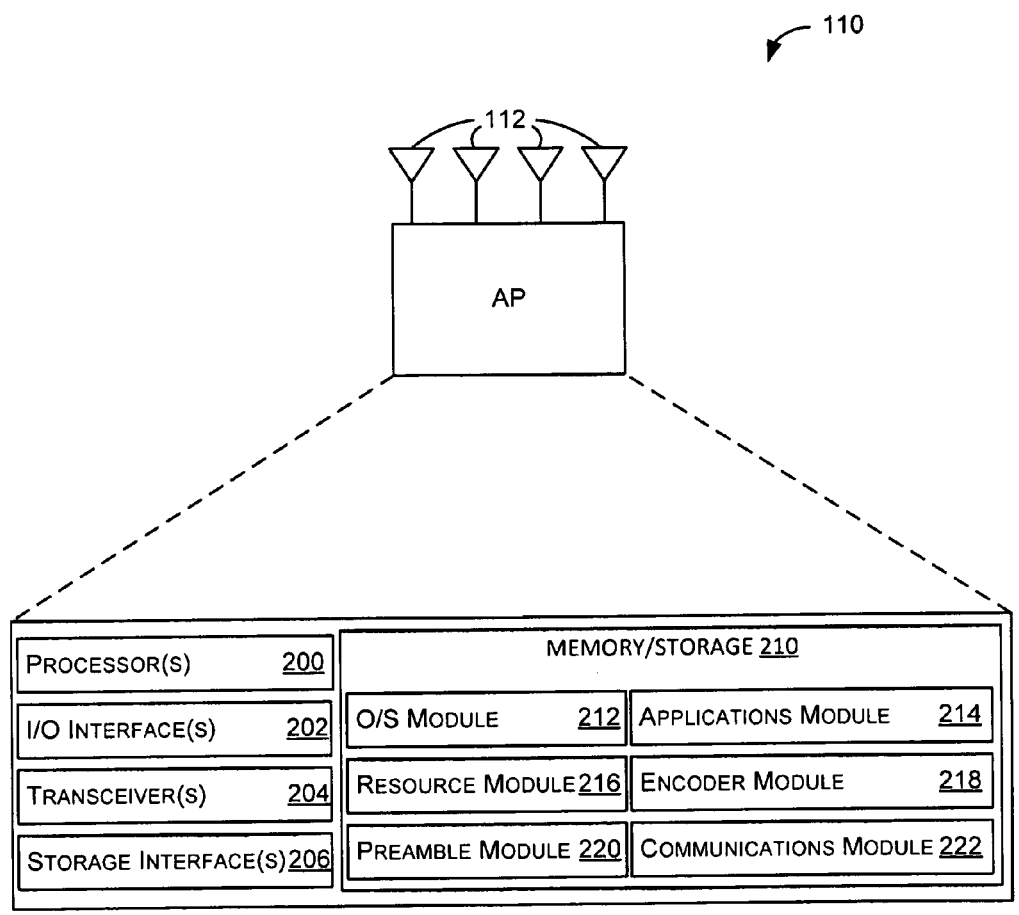
FIG. 2 depicts a simplified block diagram illustrating an example architecture of the AP of the environment of FIG. 1, in accordance with example embodiments of the disclosure.

FIG. 2 depicts a simplified block diagram illustrating an example architecture of the AP 110 of the environment of FIG. 1, in accordance with example embodiments of the disclosure. The AP 102 may include one or more antennas 112. The AP 102 may further include one or more processor(s) 200, one or more I/O interface(s) 202, one or more transceiver(s) 204, one or more storage interface(s) 206, and one or more memory or storage 210.

The one or more I/O interfaces 202 may enable the use of one or more (I/O) device(s) or user interface(s), such as a keyboard and/or mouse. The storage interface(s) 206 may enable the AP 110 to store information, such as status and/or location information or deployment information in storage devices and/or memory 210.

The transceiver 204 may be any suitable radio and/or transceiver for transmitting and/or receiving radio frequency (RF) signals in the bandwidth and/or channels corresponding to the communications protocols utilized by any of the STAs 120, 130, 140 and/or the AP 110 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas 112, may be configured to communicate via 2.4 GHz channels (e.g. 802.11b, 802.11g, 802.11n), 5 GHz channels (e.g. 802.11n, 802.11ac), or 60 GHZ channels (e.g. 802.1 lad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

The processors 200 of the AP 110 may be implemented as appropriate in hardware; software, firmware, or combinations thereof. Software or firmware implementations of the processors 200 may include computer-executable or machine-executable instructions written in any suitable programming language to perform the various functions described. Hardware implementations of the processors 200 may be configured to execute computer-executable or machine-executable instructions to perform the various functions described. The one or more processors 200 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The AP 110 may also include a chipset (not shown) for controlling communications between one or more processors 200 and one or more of the other components of the AP 110. The processors 200 may also include one or more application specific integrated circuits (ASICs) or application specific standard products (ASSPs) for handling specific data processing functions or tasks. In certain embodiments, the AP 110 may be based on an Intel® Architecture system and the one or more processors 200 and chipset may be from a family of Intel® processors and chipsets, such as the Intel® Atom® processor family.

The memory 210 may include one or more volatile and/or non-volatile memory devices including, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

The memory 210 may store program instructions that are loadable and executable on the processor(s) 200, as well as data generated or received during the execution of these programs. Turning to the contents of the memory 210 in more detail, the memory 210 may include one or more operating systems (O/S) 212, an applications module 214, a resource module 216, an encoder module 218, a preamble module 220, and a communications module 222. Each of the modules and/or software may provide functionality for the AP 110, when executed by the processors 200. The modules and/or the software may or may not correspond to physical locations and/or addresses in memory 210. In other words, the contents of each of the modules 212, 214, 216, 218, 220, 222 may not be segregated from each other and may, in fact be stored in at least partially interleaved positions on the memory 210.

The O/S module 212 may have one or more operating systems stored thereon. The processors 200 may be configured to access and execute one or more operating systems stored in the (O/S) module 212 to operate the system functions of the electronic device. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 214 may contain instructions and/or applications thereon that may be executed by the processors 200 to provide one or more functionality associated with the resource unit (RU) allocation to each of the STAs 120 and communications with the STAs 120, 130, 140. These instructions and/or applications may, in certain aspects, interact with the (O/S) module 212 and/or other modules of the AP 110. The applications module 214 may have instructions, software, and/or code stored thereon that may be launched and/or executed by the processors 200 to execute one or more applications and functionality associated therewith. These applications may include, but are not limited to, functionality such as web browsing, business, communications, graphics, word processing, publishing, spreadsheets, databases, gaming, education, entertainment, media, project planning, engineering, drawing, or combinations thereof.

The resource module 216 may have instructions stored thereon that, when executed by the processor(s) 200, enable the AP 110 to provide a variety of RU allocation functionality in any one of the operational modes of the AP 110. The processor(s) 200 may be configured to identify a RU allocation for each of the STAs 120 based on priority and/or expected data traffic associated with each of the STAs 120. The processor(s) 200 may further be configured to determine if the HE-SIG-B is to have a common part or only a STA specific part. When the HE-SIG-B is to provide an indication of a RU pattern and a RU allocation referenced to that RU pattern, then the HE-SIG-B may have both a common part and a STA specific part. The RU pattern may be indicated, such as by an RU pattern index, in the common part and the RU allocation index referenced to the RU pattern in the STA specific part. The STA specific part may be also referred to as STA specific block (or field) or user-specific block (or field). Each user-specific block (or field) can have information specific for one, two, or more STAs. The RU allocation, in some example embodiments, may be determined based at least in part on data reception/data transmission needs of each of the STAs 120, 130, 140. The processor(s) 200 may be configured to identify such requirements based at least in part on communications with each of the STAs 120, 130, 140. In example embodiments, the processor(s) 200 may be configured to receive, from each of the STAs 120, 130, 140, information pertaining to transmission/reception needs, such as transmission data buffer related metrics or expected data related metrics. The processor(s) 200 may be configured to make RU allocations based at least in part on these received transmission/reception metrics from one or more of the STAs 120, 130, 140 with which the AP 110 is to interact.

The encoder module 218 may have instructions stored therein that, when executed by the processors 200, enable the AP 110 to provide a variety of functionality associated with encoding information, including a PPDU, a preamble thereof, and an HE-SIG-B thereof. The processor(s) 200 may be configured to perform any variety of suitable encoding, such as a convolution code encoding to determine the code bits of each of the portions of the PPDU for transmission. The processor(s) 200 may further be configured to determine tail bits at the end of blocks of encoded code bits. The tail bits may be inserted to ensure, in a relatively efficient way, that the decoder on the STA side is returned to a suitable starting state such that further data bits may be decoded by that decoder on the STA side. In example embodiments, the processor(s) 200 may be configured to concatenate a common part of the HE-SIG-B with each STA specific part of the HE-SIG-B and determine code bits for the combination therefrom. After that, the processor(s) 200 may be configured to separate the code bits of each of the STA specific parts from the code bits for the common part of the HE-SIG-B. Then the processor(s) 200 may be configured to reassemble the HE-SIG-B code bits in a sequence where the common code bits are arranged first, followed by each of the STA specific code bits in succession without repeating the common part code bits with each STA specific part code bits. The processor(s) 200 after assembling these code bits, with tail bits at the end of each STA specific part code bits may transmit the same. Each of the individual STAs may reassemble the code bit sequence by placing its own STA specific code bits after the common part code bits prior to providing that sequence to a decoder (e.g., convolution code decoder, Veterbi decoder, etc.).

The processor(s) 200, by executing the instructions stored in the encoder module 218 may further be configured to determining a cyclic redundancy check (CRC) for code bits that are to be transmitted by the AP 110. This CRC may be performed for the concatenated bits of both the common part of the HE-SIG-B with each of the STA specific part bits of the HE-SIG-B. Therefore, a CRC may not be determined for the common part of the HE-SIG-B by itself. Rather, the processor(s) 200 may be configured to generate a combined CRC for each of the STA specific bits along with the common part bits. In the STA (receiver) side, the CRC may be used to identify any transmission errors associated with a combine sequence of bits including both the common part bits and the particular STA specific bits of the receiving STA. From this, the receiving STA may be able to determine if a transmission/reception error had occurred, in a combined set of common and STA specific bits.

The preamble module 220 may have instructions stored thereon that, when executed by the processor(s) 200, enable the AP 110 to provide a variety of preamble generation of the PPDU and communications functionality. In one aspect, the processor(s) 200 may be configured to generate a legacy portion of the HEW preamble (L-SIG), HE-SIG-A, and HE-SIG-B. The HE-SIG-B, may have a common part and STA specific parts corresponding to each of the STAs with which the AP 110 may communicate. The processes enabled by the preamble module 220 may cooperate with the processes enabled by the encoder module to generate a preamble for a PPDU to by transmitted by the AP 110 to one or more STAs 120, 130, 140, such as for the purposes of resource allocation.

In some embodiments, preambles may be signals and/or data packets (and/or portions of data packets) used in network communications to synchronize transmission timing between two or more devices (e.g., between the first device and the second device). Preambles may include scheduling information, address information, and/or the like to assist in directing transmission of the data packets from the first device and to the second device. Further, these preambles may enable the second device to detect a new incoming data packet from the first device. A defined length of a preamble may affect the time it takes to transmit data (e.g., data packets), which in turn may undesirably affect (e.g., increase) data packet overhead.

The communications module 222 may have instructions stored thereon that, when executed by the processor(s) 200, enable the AP 110 to provide a variety of functionality related to communicating a PPDU, along with signaling and/or resource allocation information associated therewith, such as in a preamble and/or HE-SIG-B field. The processor(s) 200 may be configured to invoke the transceiver(s) 204 to transmit the PPDU and the preamble therein via the antennas 112 to one or more STAs 120, 130, 140.

It will be appreciated that there may be overlap in the functionality of the instructions stored in the operating systems (O/S) module 212, the applications module 214, the resource module 216, the encoder module 218, the preamble module 220 and/or the communications module 222. In fact, the functions of the aforementioned modules 212, 214, 216, 218, 220, 222 may interact and cooperate seamlessly under the framework of the AP 110. Indeed, each of the functions described for any of the modules 212, 214, 216, 218, 220, 222 may be stored in any module 212, 214, 216, 218, 220, 222 in accordance with certain embodiments of the disclosure. Further, in certain embodiments, there may be one single module that includes the instructions, programs, and/or applications described within the operating systems (O/S) module 212, the applications module 214, the resource module 216, the encoder module 218, the preamble module 220 and/or the communications module 222.

Figure 3:
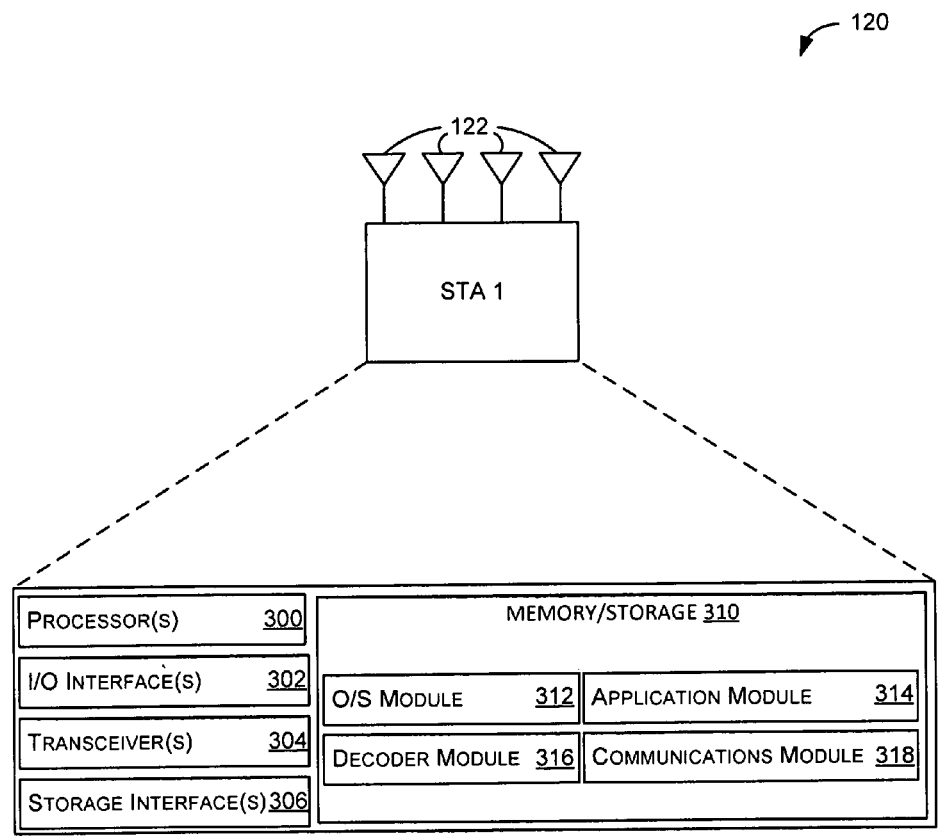
FIG. 3 depicts a simplified block diagram illustrating an example architecture of a station device (STA) of the environment of FIG. 1, in accordance with example embodiments of the disclosure.

FIG. 3 depicts a simplified block diagram illustrating an example architecture of a station device (STA) 120 of the environment 100 of FIG. 1, in accordance with example embodiments of the disclosure. The STA 120 may further include one or more processor(s) 300, one or more I/O interface(s) 302, one or more transceiver(s) 304, one or more storage interface(s) 306, and one or more memory or storage 310. The descriptions of the one or more processor(s) 300, one or more I/O interface(s) 302, one or more transceiver(s) 304, one or more storage interface(s) 306, and the one or more memory or storage 310 of the STA 120 of FIG. 3 may be substantially similar to the descriptions of the one or more processor(s) 200, one or more I/O interface(s) 202, one or more transceiver(s) 204, one or more storage interface(s) 206, and the one or more memory or storage 210, respectively of the AP 110 of FIG. 2, and in the interest of brevity, will not be repeated here.

The memory 310 may store program instructions that are loadable and executable on the processor(s) 300, as well as data generated or received during the execution of these programs. Turning to the contents of the memory 310 in more detail, the memory 310 may include one or more operating systems (O/S) 312, an applications module 314, a decoder module 316, and a communications module 318. Each of the modules and/or software may provide functionality for the STA 120, when executed by the processors 300. The modules and/or the software may or may not correspond to physical locations and/or addresses in memory 310. In other words, the contents of each of the modules 312, 314, 316, 318 may not be segregated from each other and may, in fact be stored in at least partially interleaved positions on the memory 310. The descriptions of the O/S module 312 and the application(s) module 314 of the STA 120 of FIG. 3 may be substantially similar to the descriptions of the O/S module 212 and the application(s) module 214 of the AP 110 of FIG. 2 and in the interest of brevity, will not be repeated here.

The decoder module 316 may have instructions stored thereon that, when executed by the processor(s) 300, enable the STA 120 to provide a variety of functionality pertaining to decoding encoded bits received by the STA 120. The processor(s) 300 may be configured to receive a PPDU and identify the preamble therefrom. The processor(s) 300 may further be configured to identify a first part of the HEW preamble (e.g., HE-SIG-A) to decode a second part of the preamble (e.g., HE-SIG-B). The processor(s) 300 may still further be configured to use the information carried in the HE-SIG-A to decode the HE-SIG-B. After decoding the HE-SIG-B, the processor(s) 300 may perform a CRC check on a combined common part of the HE-SIG-B and the STA specific part of the HE-SIG-B. This CRC, when compared to the CRC bits at the end of each of the STA specific parts of the HE-SIG-B may indicate to the STA 120 whether the common part and the STA specific part of the HE-SIG-B were received in an error-free state. The STA specific part may be also referred to as STA specific block (or field) or user-specific block (or field). Each user-specific block (or field) can have information specific for one, two, or more STAs.

The processor(s) 300, by executing the instructions stored in the decoder module 316, may further be configured to rearrange the received code bits of the common part and the its own STA specific part in sequence and then provide that sequence of code bits to a decoder, such as a convolution decoder and/or veterbi decoder. In this way, the tail bits may be a suitably applied to the decoder to place the decoder into an appropriate starting point. The tail bits as received may only be at the end of the STA specific part of the receiving STA and there may not be any tail bits at the end of the common part of the HE-SIG-B. While this may lead to a more efficient signaling field and preamble of the PPDU, it also means that the processor(s) 300 may not be configured to decode the common field and the STA specific field code bits independently. If the STA was to attempt to decode the common part code bits independently from the STA specific part, the decoder may not be placed in a suitable state at the end of the common part decoding and, therefore, there is no assurance that whatever code bits are decoded next would be decoded properly. Thus, the processor(s) 300 may be configured to buffer the common field code bits of the HE-SIG-B, such as in storage/memory 310, and concatenate the common field code bits with that STA's STA specific code bits prior to decoding that full sequence of code bits. The tail bits at the end of the STA specific code bits may then place the decoder back into a suitable starting state for being able to decode a next series of received encoded data bits.

The communications module 318 may have instructions stored thereon that may be executed by the processor(s) 300 to receive and analyze PPDUs from the AP module 102 to identify a RU allocation. Once the HE-SIG-B is decoded, such as by the processes enabled by the decoder module 316, the processor(s) 300 may be configured to determine if the HE-SIG-B has a common part or only a STA specific part. The STA 120 may look for its self-identifier, such as PAID, within the STA specific part of the HE-SIG-B to determine its corresponding resource allocation. Depending on the resource allocation, the STA may communicate with the AP 110 in accordance with the RUs, multi-user (MU) partitions, and/or streams indicated in the HE-SIG-B.

It will be appreciated that there may be overlap in the functionality of the instructions stored in the operating systems (O/S) module 312, the applications module 314, the decoder module 316, and the communication module 318. In fact, the functions of the aforementioned modules 312, 314, 316, 318 may interact and cooperate seamlessly under the framework of the STAs 120, 130, 140. Indeed, each of the functions described for any of the modules 312, 314, 316, 318 may be stored in any module 312, 314, 316, 318 in accordance with certain embodiments of the disclosure. Further, in certain embodiments, there may be one single module that includes the instructions, programs, and/or applications described within the operating systems (O/S) module 312, the applications module 314, the decoder module 316, and the communication module 318.

Figure 4:
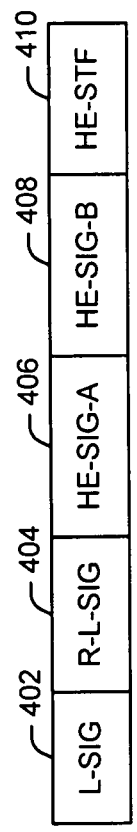
FIG. 4 depicts a datagram illustrating an example preamble of a physical layer convergence protocol (PLCP) protocol data unit (PPDU) used for allocating frequency resource units (RU) by the AP to the STA, in accordance with example embodiments of the disclosure.

FIG. 4 depicts a datagram illustrating an example preamble 400 of a physical layer convergence protocol (PLCP) protocol data unit (PPDU) used for allocating frequency resource units (RU) by the AP to the STA, in accordance with example embodiments of the disclosure. The preamble 400 field may have various fields: legacy field (L-SIG) 402, a repeated L-SIG (R-L-SIG) 404, a first high efficiency signaling field (HE-SIG-A) 406, a second high efficiency signaling field (HE-SIG-B) 408, and a high efficiency short training field (HE-STF) 410. HE-SIG-B 408 may include information for scheduled STAs 120. HE-SIG-A 406 may include the information needed for decoding HE-SIG-B 408, e.g. MCS of HE-SIG-B 408, length of HE-SIG-B 408, and/or guard interval (GI) length of HE-SIG-B 408). The HE-SIG-B 408 may include information needed for decoding the data of all scheduled STAs 120. The preamble 400 may also include a legacy preamble portion (L-SIG) 402 to enable backward compatibility.

In some embodiments, an R-L-SIG may or may not be included in the physical layer header. In some embodiments, a HE-SIG-A includes information defining a total bandwidth, any common information for a cell (e.g., color bits and/or a partial cell identification (ID)), formation information about HE-SIG-B (e.g., a number of orthogonal frequency-division multiplexing (OFDM) symbols), and/or the like. HE-SIG-A 406 may include common information shared by all of the scheduled STAs 120 and nearby unscheduled STAs 120. HE-SIG-B may include information about scheduled users (e.g., devices such as transmitters and/or receivers of data packets or signals, and/or the like) such as bandwidth allocation, spatial stream allocation, partial access IDs (PAIDs), and/or modulation coding scheme (MCS) of each scheduled user and/or device.

Beamforming or spatial filtering is a signal processing technique used in sensor arrays for directional signal transmission or reception. Beamforming may be used at both the transmitting and receiving ends of a device in order to achieve spatial selectivity in regards to channel and/or subchannel allocation. It is understood that beamforming may be used for radio or sound waves and may be found in applications such as radar, sonar, seismology, wireless communications, radio astronomy, acoustics, and/or biomedicine. Since a HE-SIG-B portion of a physical layer header needs to be received reliably without the aid of beamforming, it may be desired to encode each user's specific information individually so that each user may get its schedule information even if the other part of HE-SIG-B is in decoding error.

Figure 5:
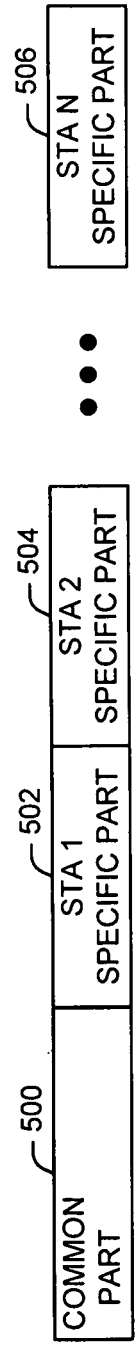
FIG. 5 depicts a datagram illustrating an example HE-SIG-B portion of the example preamble of FIG. 4 with a common part and a STA specific part, in accordance with example embodiments of the disclosure.

FIG. 5 depicts a datagram illustrating an example HE-SIG-B portion 408 of the example preamble 400 of FIG. 4 with a common part 500 and a STA specific part 502, 504, 506, in accordance with example embodiments of the disclosure. Each STA specific part can have information specific for one, two, or more STAs. For example, the STA specific part 502 can comprise user-specific information for one or two users.

In some embodiments, common information for all scheduled users may be encoded together for reducing overhead without reducing the reliability in the common part 500 of the HE-SIG-B 408. Therefore, a common portion may be introduced (e.g., encoded) in an HE-SIG-B portion of a physical layer header for purposes of bandwidth allocation and/or stream allocation. Although common information may be encoded into each user's specific portion 502, 504, 506 of the physical layer header that is individually encoded, individual encoding would require allocation bits for bandwidth allocation and/or stream allocation to be sent multiple times in the users' individually encoded portions, which disadvantageously increases overhead. For example, a first user would receive allocation bits bandwidth allocation and/or stream allocation related to other users, which is not needed by the first user. As such, it may be advantageous to remove bandwidth allocation and/or stream allocation information from individually-encoded portions of a physical layer header and/or an HE-SIG-B portion of a physical layer header and instead encode bandwidth allocation and/or stream allocation information separately and send them in a common portion. In this manner, encoding bandwidth allocation and/or stream allocation information separately and sending the information in a common portion reduces overhead and enhances reliability.

The common portion 500 may include bandwidth allocation and/or spatial stream allocation of one or more users. In some embodiments, a fixed length design for bandwidth allocation and/or stream allocation may be utilized. In other embodiments, a variable length design may be utilized. Typically, bandwidth allocation divides a frequency band into one or more subbands. The subbands may have uniform or different sizes. For MU-MIMO, each subband may include one or more spatial streams of data packets (e.g., data, information, and/or the like). Spatial stream allocation typically sequentially allocates spatial streams to scheduled users on each subband. For example, in operation of a pure orthogonal frequency-division multiple access (OFDMA) mode, only one spatial stream is included in each subband and therefore stream allocation information is not needed. In some embodiments, an indication of a pure OFDMA mode may be encoded and/or included in a HE-SIG-A portion of a physical layer header.

A common portion 500 may be encoded by channel encoder using one code word (e.g., encoding scheme). In some embodiments, a cyclical redundancy check (CRC) may be added to an end and/or a beginning of a common portion or another portion of a physical layer header as a protective measure. The CRC may or may not be masked by a cell ID (e.g., color bits). Similarly, each scheduled station's (STA's) (e.g., user's) 120, 130, 140 specific information (e.g. STA 1's) may be also encoded by a channel encoder separately using one code word with a CRC. The CRC may be masked by at least a portion of a user's ID (e.g., the first 8 bits of a PAID).

Upon receipt, a scheduled STA 120, 130, 140 may first decode a common portion of a physical layer header to identify the frequency and spatial configuration of the resource (e.g., transmitter, access point, data packet, signal, and/or the like). The STA 120, 130, 140 may then search the physical layer header for station-specific parts sequentially to identify its identity (e.g., PAID). For example, STA 2 130 of FIG. 1 may decode a common portion first and then may identify STA 1's specific portion 502 identifying STA 1's ID and CRC. Since a CRC or an ID of STA 1's specific portion 502 does not match a STA 2 130, STA 2 may then continue on to decode STA 2's specific part 504 where STA 2 identifies a matching CRC or ID. In this manner, STA 2 130 identifies a modulation coding scheme (MCS) used in its subband and stream(s) allocated in the common portion. The length of each station specific portion may be a fixed number (e.g., 16 bits) or dynamic.

The common portion 500 of a physical layer signaling header 408 is typically inclusive of all scheduled users. A scheduled user may learn about (e.g., decode) a frequency band partition and spatial stream partition from a common portion of a physical layer header. In some embodiments, a bandwidth allocation portion of a common portion may be specified first (or, alternatively, last). The bandwidth allocation portion may specify how available a band (e.g., a communication channel) is divided into subbands with uniform and/or different sizes.

Next, a stream allocation portion of each subband may follow the bandwidth allocation partition. The stream allocation portion may specify how each stream is allocated for each subband as specified in a bandwidth allocation portion. In some embodiments, a 2-dimensional transmission resource in frequency and space domain now breaks down to allocations after the bandwidth and stream allocations. For each allocation, an indication of each scheduled station's ID (e.g., PAID and its MCS) may be specified with individual channel encoding and CRC. A mapping between the linearly arranged, station- (e.g., user-) specific parts and the 2D allocations. The mapping may be space first or frequency first.

For pure OFDMA mode, the stream allocation may be skipped if there is only one spatial stream in each subband. An indication bit may be put in HE-SIG-A or the beginning of HE-SIG-B to specify whether the stream allocation is skipped or not.

For decoding a common portion, a STA 120, 130, 140 may identify a length of the common portion such that a convolutional decoder may exploit tail bits or tail biting property and a CRC at an end of the common portion, in example embodiments. A bandwidth allocation portion may have a fixed or dynamic length. Namely, a number L−1 bits may be required to be included a bandwidth allocation portion for a band with L resource units or blocks. A length of the common part is mainly determined by the number of subbands. The number of subbands may be counted after the bandwidth allocation portion is decoded and bandwidth allocation information is extracted. Therefore, a bandwidth allocation portion may be encoded separately from a common portion. Further, a first CRC may be included after the bandwidth allocation portion for validating the determined number of subbands and a second CRC may be included at the end of the common portion for validating the entire common portion including the bandwidth allocation portion.

In some embodiments, the first CRC is longer, shorter, and/or the same duration as the second CRC.

In some embodiments, a bandwidth allocation portion of a common portion is encoded individually with tail bits or tail biting. A CRC operation portion may or may not be adjacent to a bandwidth allocation portion in a physical layer header. The receiver decodes the bandwidth allocation portion, which typically has a fixed length, and may check (e.g., execute) a CRC. After the bandwidth allocation portion is decoded and bandwidth allocation information is extracted from the bandwidth allocation portion, a number of sub-bands included in a band and/or channel may be determined based at least in part on an analysis of bandwidth allocation information. In example embodiments, a single CRC for each STA 120, 130, 140 may be included at the end of the respective STA specific portion 502, 504, 506. This single CRC may pertain to both the code bits in the STA specific part 502, 504, 506, as well as the common part 500. In some embodiments, one or more portions of the physical layer header may be analyzed and/or checked for error based on one or more CRCs. An error check may include determining and/or identifying an error. Upon detection of an error, an entire signal and/or a portion determined to have an error may be retransmitted or rescheduled for transmission.

Each scheduled STA 120, 130, 140 may decode code words and/or code bits included in a common portion and a STA-specific portion of the HE-SIG-B structure 408. Namely, each STA may successfully decode two portions of the HE-SIG-B structure 300 instead of only one common, jointly-encoded portion. For example, each scheduled STA typically needs to successfully decode both a common part and its own STA-specific part in order to continue decoding any data portions encoded within and/or associated with the preamble structure 400. Encoding and/or decoding in this manner may increase the packet error rate (PER) compared to another design that doesn't include a common portion (e.g., includes STA-specific portions only and/or includes only a common portion) but has a larger overhead.

Furthermore, inclusion of tail bits (e.g., approximately 6 bits included at the end of a common portion of the HE-SIG-B structure 300 that are used for encoding/decoding, STA identification, allocation information, filler, non-informational bits, and/or the like) in a common portion may add a significant overhead to the common portion, which typically has a bit length of approximately 10-30 bits. Tail bits may be utilized to reset a convolutional code encoder and/or decoder to a predetermined state.

In some embodiments, the tail bits at the end of the common part 500 of the HE-SIG-B 408 may be removed from the common portion of the HE-SIG-B structure 408 to reduce preamble overhead. However, removing the tail bits in the common part 500 utilizing tail biting convolutional coding (TBCC) may degrade performance. For example, utilizing TBCC typically introduces a 0.9-1.2 dB degradation in signal quality as opposed to utilizing a common portion that includes tail bits. In example embodiments of the disclosure, tail bits may be removed from the common part 500 of the HE-SIG-B 408 without the use of TBCC. In example embodiments, unified tail bits for each STA 120, 130, 140 with which the AP 110 is to communicate is determined based at least in part on both the common part code bits 500 and the STA's own code bits 502, 504, 506 and may be included at the end of each of the STA specific parts 502, 504, 506.

Since a scheduled STA typically decodes the common portion and its STA-specific portion, the common portion may be utilized to initialize an encoder for encoding the STA's specific part. Namely, and as seen from the perspective of a receiving and/or decoding STA, a common portion and an STA-specific portion may be continuously encoded by one code word. As such, tail bits of the common portion 500 may not be required to be included in the common portion 500. Since both the common portion and the STA-specific portion are relatively short in length (e.g., approximately 10-30 bits) for utilization of TBCC with a constraint length of 7 bits, the PER of the longer, combined content (e.g., a jointly-encoded common portion and STA-specific portion(s)) may be lower (e.g., may include fewer errors) than the original PER where a common portion and an STA-specific portion are individually encoded and decoded. For example, an individually-encoded common portion and STA-specific portion (e.g., using multiple code words and/or code bits to encode a common portion and an STA-specific portion individually and/or separately) may each cause a decoding failure (e.g., may cause multiple decoding failures), whereas a jointly-encoded common portion and STA-specific portion may only cause one failure when decoding both portions at the STA 120, 130, 140.

Figure 6:
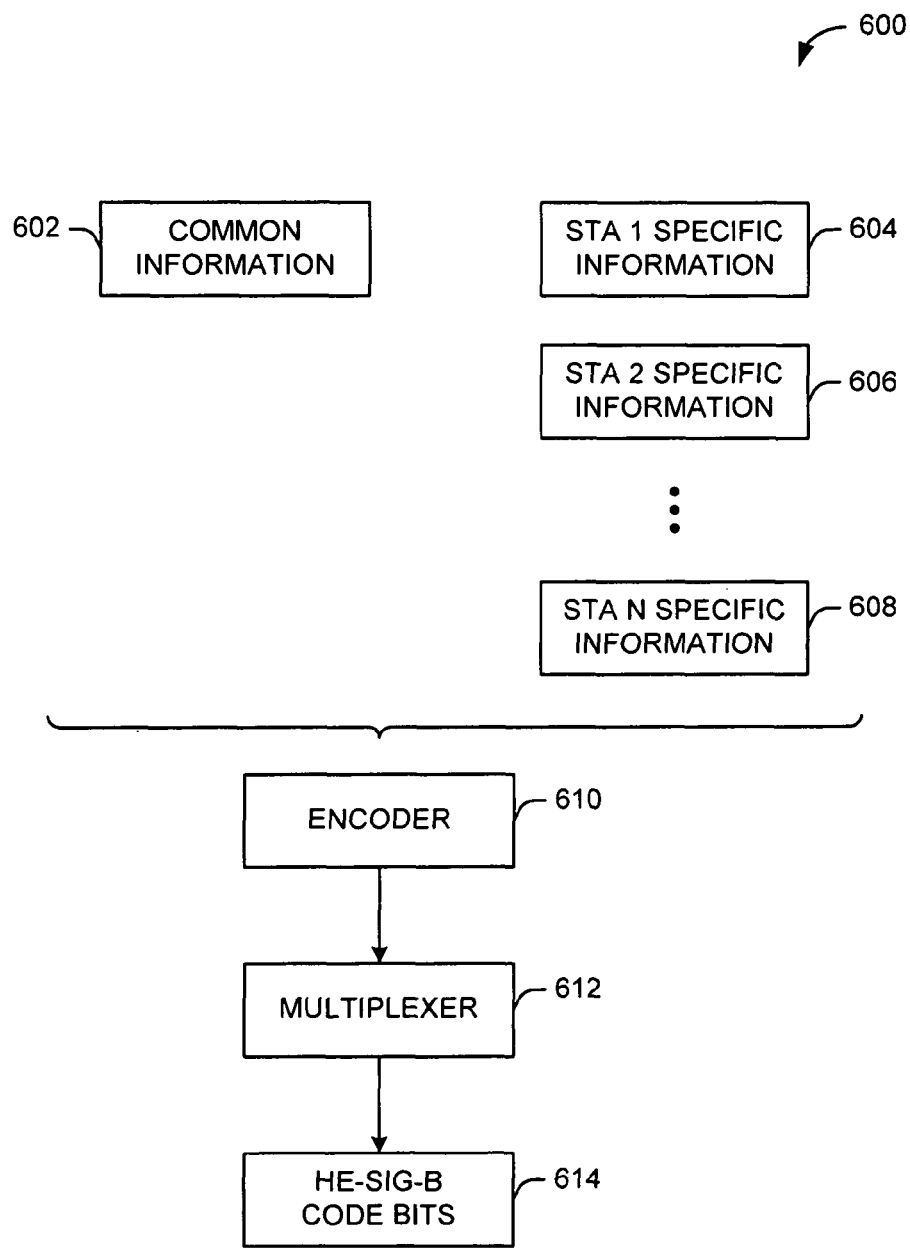
FIG. 6 depicts a simplified block diagram illustrating an example mechanism for generating HE-SIG-B code bits, in accordance with example embodiments of the disclosure.

FIG. 6 depicts a simplified block diagram illustrating an example mechanism for generating HE-SIG-B code bits, in accordance with example embodiments of the disclosure.

As stated above, CRC overhead can be reduced by not including a CRC operation in the common part and instead provided in each scheduled STA's specific part to validate the contents in both the common part and its STA-specific part. In some embodiments, a 6-11 bit CRC may be reduced in the preamble 400 by validating transmitted/received data with CRC operations in the STA-specific part only. Common information from all scheduled STA portions may be identified and extracted from each portion and included into a common part in the HE-SIG-B portion of the preamble structure. This may save preamble overhead since common information may not need to be repeated in each STA's specific part. In some embodiments, overhead may be reduced by about 20% compared to including a separate CRC in the common part 500, while maintaining substantially the same reliability.

As depicted, on the AP 110 side, common information 602 that may be provided to all of the scheduled stations 120, 130, 140 may be determined by the one or more processor(s) 200. Additionally, the STA specific information 604, 606, 608 for each of the STAs 120, 130, 140, respectively, may be determined by the processor(s) 200. Next, this information 602, 604, 606, 608 may be provided to an encoder 610 and/or a multiplexer 612 to generate code bits 614 of the HE-SIG-B. These code bits 614, in some example embodiments, may be convolution code bits. In some example embodiments, the code bits 614 may have a CRC provided at the end of each of the STA specific code bits. This CRC may be based at least in part on both the corresponding STA specific code bits, along with the code bits for the common part. In some example embodiments, the code bits 614 may have tail bits at the end of each of the STA specific parts. These tail bits may be based at least in part on both the common information 602, as well as each of the STA specific information 604, 606, 608.

Figure 7:
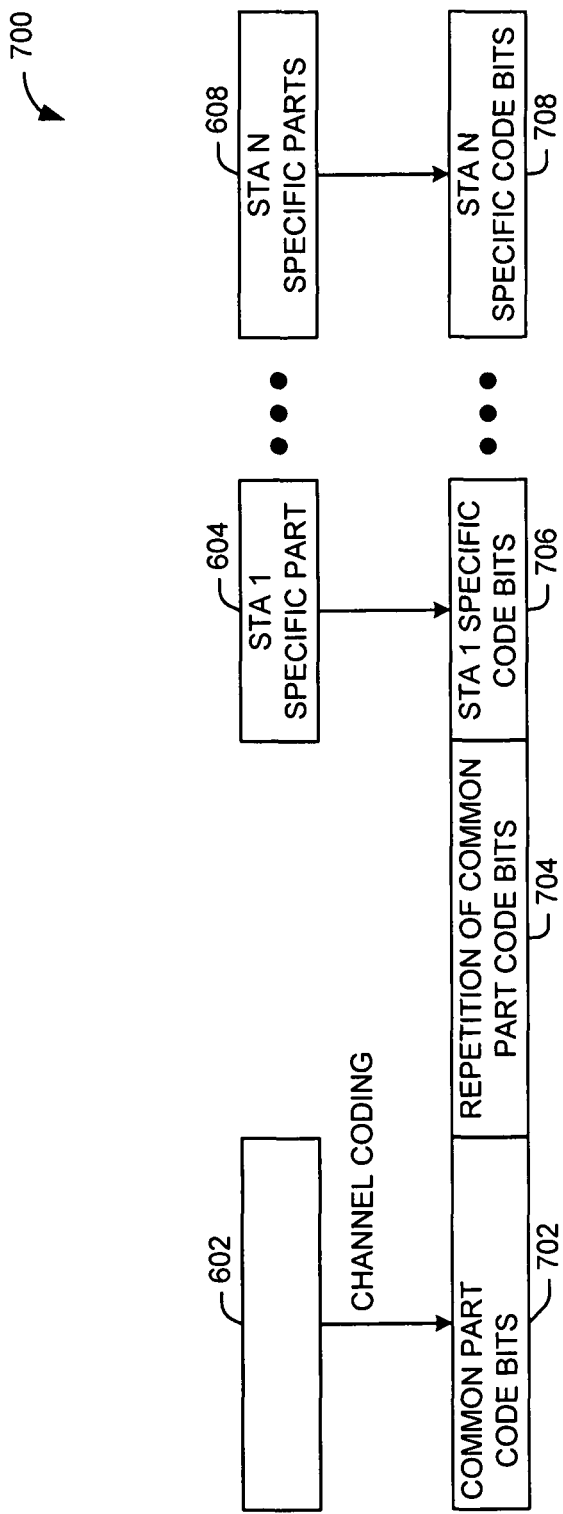
FIG. 7 depicts a datagram illustrating an example HE-SIG-B that includes a repeated common part code bits and STA specific code bits, in accordance with example embodiments of the disclosure.

FIG. 7 depicts a datagram illustrating an example HE-SIG-B that includes a repeated common part code bits 702, 704 and STA specific code bits 706, 708, in accordance with example embodiments of the disclosure. The channel coding process may utilize the common information 602 and each of the STA specific information 604, 608 to generate corresponding STA specific code bits 706, 708. According to example embodiments, each of the STA specific parts 706, 708 may have a CRC (e.g., 6-8 CRC bits) that is based at least in part on both the corresponding STA specific part 604, 608, as well as the common part 702. In further example embodiments of the disclosure, each of the STA specific code bits 706, 708 may conclude with tail bits that are based at least in part on both the common part 702 and each of the respective STA specific part 604, 608.

Figure 8:
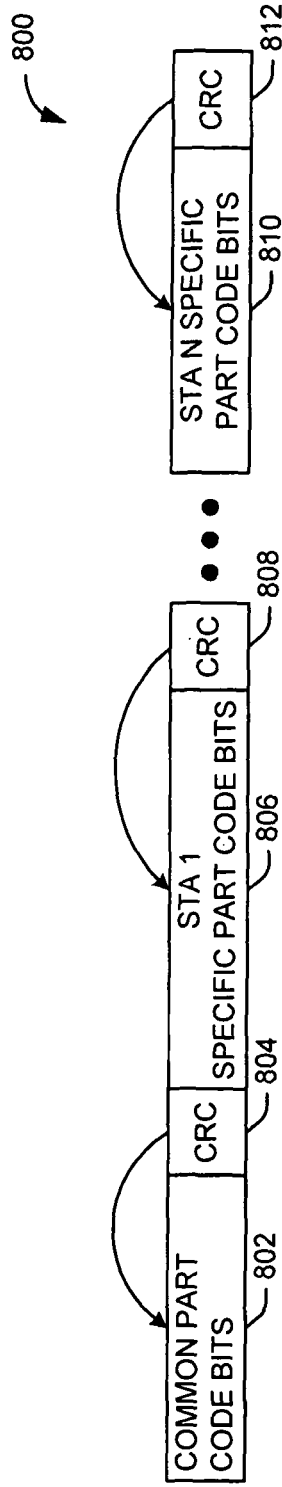
FIG. 8 depicts a datagram illustrating an example HE-SIG-B with common part code bits with a corresponding cyclic redundancy check (CRC) and a CRC corresponding to each of the STA specific part code bits, in accordance with example embodiments of the disclosure.

FIG. 8 depicts a datagram illustrating an example HE-SIG-B 800 with common part code bits 802 with a corresponding cyclic redundancy check (CRC) 804 and a CRC 808, 812 corresponding to each of the STA specific part code bits, in accordance with example embodiments of the disclosure. In this example embodiment, the common part 802 may have its own CRC 804 and each of the STA specific parts 806, 810 may have their own CRCs 808, 812, respectively. It will be appreciated that in this datagram 800, having a separate CRC for the common part and each of the STA specific parts may lead to a relatively longer preamble than if there is a single CRC for both the common part 802 and each of the STA specific parts 806, 810.

Figure 9:
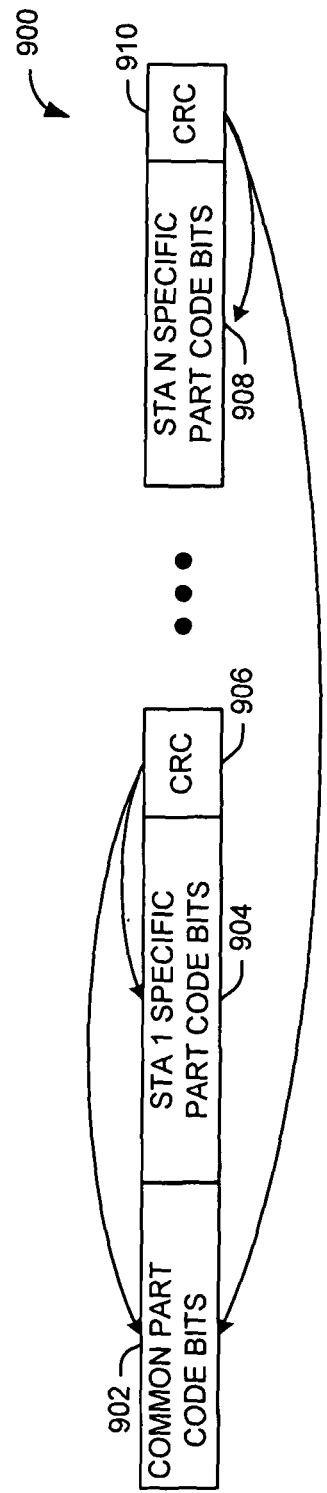
FIG. 9 depicts a datagram illustrating an example HE-SIG-B with common part code bits without a corresponding CRC and with a CRC corresponding to each of the STA specific part code bits that is based at least in part on both the STA specific code bits and the common part code bits, in accordance with example embodiments of the disclosure.

FIG. 9 depicts a datagram illustrating an example HE-SIG-B 900 with common part code bits 902 without a corresponding CRC and with a CRC 906, 910 corresponding to each of the STA specific part code bits 904, 908 that is based at least in part on both the STA specific code bits 904, 908 and the common part code bits 902, in accordance with example embodiments of the disclosure. As shown here, the CRC 906 corresponding to the STA 1 specific code bits 904 may be based at least in part on both the STA 1 specific part code bits 904 and the common part code bits 902. Similarly, the CRC 910 corresponding to the STA 2 specific code bits 908 may be based at least in part on both the STA 2 specific part code bits 908 and the common part code bits 902. As can be seen, compared to the HE-SIG-B 800 of FIG. 8, but not having individual CRC for the common part, a shorter HE-SIG-B 900 may be generated. Additionally, the receiving stations are still able to detect any type of transmission/reception errors based at least in part on a unified CRC that is based at least in part on that STA's STA specific part along with the common part.

Figure 10:
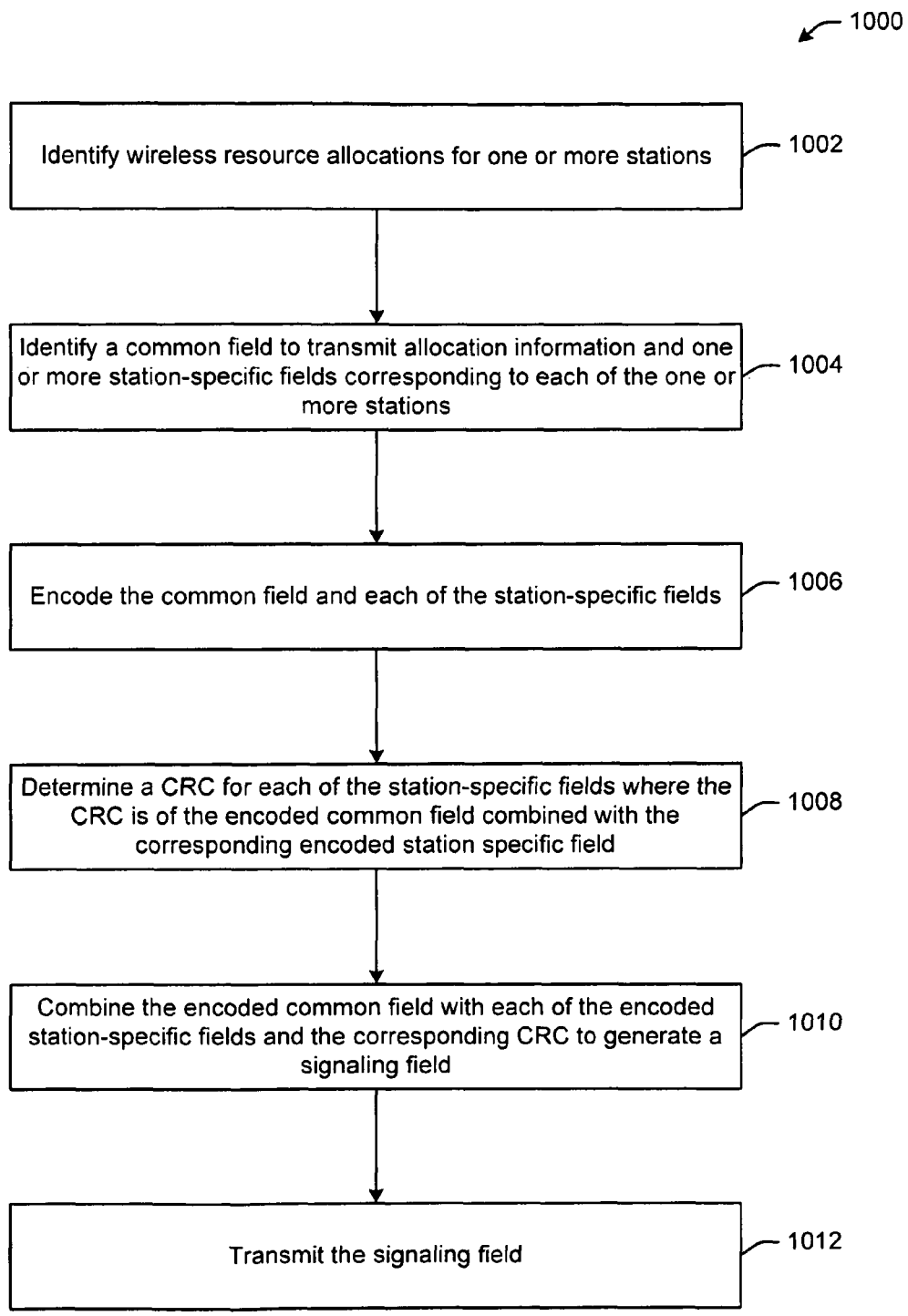
FIG. 10 depicts a flow diagram illustrating an example method for generating a signaling field with CRC bits corresponding to both of STA specific code bits and common code bits, in accordance with example embodiments of the disclosure.

FIG. 10 depicts a flow diagram illustrating an example method 1000 for generating a signaling field with CRC bits corresponding to both of STA specific code bits and common code bits, in accordance with example embodiments of the disclosure. This method 100, in example embodiments, may be performed by the encoding side or AP 110 and the processor(s) 200 thereon, in some case in cooperation with one or more other elements of environment 100.

At block 1002, wireless resource allocations for one or more stations may be identified. This may entail identifying a group of tones and time span that the group of tones may be used in a dedicated manner by a particular STA, in some cases, such as when operating in OFDMA mode. In other cases, identifying resource allocations for one or more STAs may entail determining a MU partition, as well as streams (e.g., spatial allocations) for each of the STAs, such as in MU-MIMO mode. These resources may be allocated based on any variety of factors, including, for example an indication of the amount of data each of the STAs are to transmit and/or receive.

At block 1004, a common field to transmit allocation information and one or more station specific fields corresponding to each of the one or more stations may be identified. The common field may include a variety of information that may need to be provided to all of the STAs with which the AP 110 is to interact. This type of information may include a size of a channel, the subdivisions of the channel, indexing information of the particular channels, MCS to be used, etc. The STA specific fields may include information about the resources allocated to each of the specific STAs, such as tones (e.g., frequency blocks), MU partitions, spatial partitions, or the like.

At block 1006, the common field and each of the station specific fields may be encoded. In some example embodiments, the encoding may be performed by a convolution code encoder. In some cases, each of the common field and the STA specific fields may each have their own tail bits. In other cases, the common field and each of the STA specific fields may have unified tail bits, such as at the end of each of the STA specific fields. As mentioned above, the tail bits may place the decoder on the STA side back to an initial state, such that the decoder may decode new data without errors.

At block 1008, a CRC for each of the STA specific fields may be determined, where the CRC is of the encoded common field along with the corresponding encoded STA specific field. In some alternate example embodiments, the CRC may be of the pre-encoded common field and STA specific fields.

At block 1010, the encoded common field may be combined with each of the encoded STA specific fields and their respective CRCs to generate a signaling field. The signaling field, as generated here, may be a HE-SIG-B field that is to part of a preamble of a PPDU. At block 1012, the signaling field may be transmitted.

It will be appreciated that in some example embodiments, as indicated in FIG. 7, the common part of the signaling field may be repeated prior to concatenating the STA specific parts of the signaling field. The repetition of the common part may allow for the receiving STA(s) to compare the first copy to the second copy of the common part to make sure that there is no errors in transmission of the common part of the signaling field. In some cases, errors may be detected based at least in part on the repetition of the common part of the signaling field and may be used in conjunction with the CRC bits to repair the error on the receiving side (e.g., receiving STA). The repetition of the common part may result in a lower error rate (e.g., PER, BER, etc.) in the transmission/receipt of the common part of the signaling field.

In various embodiments, a second copy of the common part code bits may not need to be generated again because the second copy may already be generated from the first set of station specific information bits. The encoder can use the last few bits, e.g. 6 bits of the common part, to initialize the encoder state for encoding the second set of the specific part.

It should be noted, that the method 1000 may be modified in various ways in accordance with certain embodiments of the disclosure. For example, one or more operations of method 1000 may be eliminated or executed out of order in other embodiments of the disclosure. Additionally, other operations may be added to method 1000 in accordance with other embodiments of the disclosure.

Figure 11:
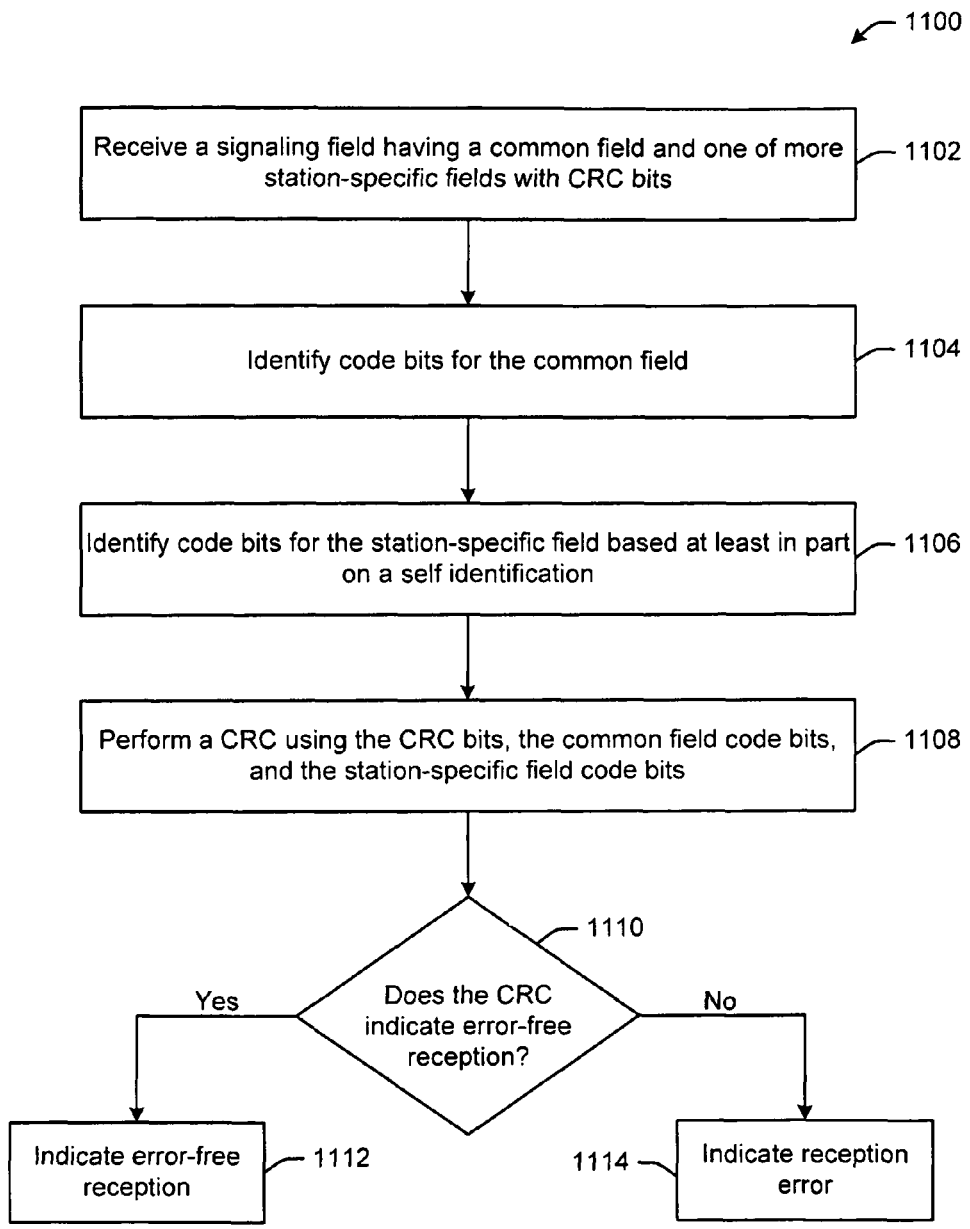
FIG. 11 depicts a flow diagram illustrating an example method for identifying reception error at a STA using CRC bits corresponding to both of STA specific code bits and common code bits in a signaling field of a preamble of a PPDU, in accordance with example embodiments of the disclosure.

FIG. 11 depicts a flow diagram illustrating an example method 1100 for identifying reception error at a STA using CRC bits corresponding to both of STA specific code bits and common code bits in a signaling field of a preamble of a PPDU, in accordance with example embodiments of the disclosure. The method 1100 may be performed by one or more STAs and the processor(s) 300 thereon.

At block 1102, a signaling field having an encoded common field and one or more station specific fields may be received, where each station specific field has corresponding CRC bits. This signaling field may be received via the antenna 122 and/or transceiver 304 of the receiving STA. The signaling field may be similar to the signaling field transmitted by the processes of method 1000 of FIG. 10. The signaling field may be a HE-SIG-B of a preamble of a PPDU and may indicate resources allocated to the receiving STA.

At block 1104, code bits for the common field may be identified. These code bits may be identified based on information determined by the processor(s) 300 based on parts of the preamble (e.g., L-SIG, HE-SIG-A, etc.) that may have preceded the HE-SIG-B signaling field. The common field may indicate any variety of information therein that may be used by more than one and/or all of the STAs with which the AP 110 may communicate.

At block 1106, the code bits for the station specific field may be identified based at least in part on self-identification. In example embodiments, the STA that receives the signaling field (e.g., the HE-SIG-B as part of a preamble and a full PPDU) may have an identifier for itself. This identifier, in some example embodiments, may be a fixed identifier of the STA. In other example embodiments, the identifier may be assigned and/or determined by or in interacting with the AP 110. In some example embodiments, the identifier may be a partial access identification (PAID). This PAID may be assigned to each of the STAs, by the AP 110, during one or more handshaking procedures, prior to assignment of resources. Once the STA receiving the signaling field and performing this method 1100 has self-identification, it can identify its STA specific portion by recognizing its own identifier. For example, a STA, after identifying a common portion of the signaling field may identify its own PAID within the STA specific part of the signaling field and then may determine the code bits following the PAID (e.g., a predetermined length and/or until the next PAID) as its STA specific code bits.

At block 1108, the receiving STA and the processor(s) 300 thereon may perform a CRC of the common portion code bits of the signaling field along with its own STA specific portion code bits. It may then compare its determined CRC value to the received CRC value to determine, at block 1110, if the CRC indicates error-free reception. If an error free reception is determined then the STA and the processor(s) 300 thereon may indicate the same at block 1112. Alternatively, if an error-free reception is not determined at block 1110, then it may be indicated at block 1114 that there was a reception/transmission error. In some example embodiments, if an error-free reception is determined, then the resource allocation information, as indicated by the signaling field may be used by the STA for the purposes of communicating with the AP 110 and/or one of the other STAs directly. On the other hand, if a reception/transmission error is, in fact, detected, then the STA may indicate that there was an error to the AP 110, wait for a new allocation of resources, and/or wait for a retransmission of the signaling field.

It will be appreciated that in some cases the signaling field may include a repetition of the common part of the HE-SIG-B prior to the start of the STA specific parts of the HE-SIG-B. In these cases, the receiving STA and the processor(s) 300 thereon may compare the first copy and the repeated copy of the common part of the HE-SIG-B to determine if there is, in fact any discrepancy between the two, and thus a transmission/reception error (e.g., bit error, packet error, etc.). In some cases, the STA may be configured to repair errors that may be detected in the common part of the signaling field, based at least in part on the repetition of the common part and/or the CRC.

It should be noted, that the method 1100 may be modified in various ways in accordance with certain embodiments of the disclosure. For example, one or more operations of method 1100 may be eliminated or executed out of order in other embodiments of the disclosure. Additionally, other operations may be added to method 1100 in accordance with other embodiments of the disclosure.

Figure 12:
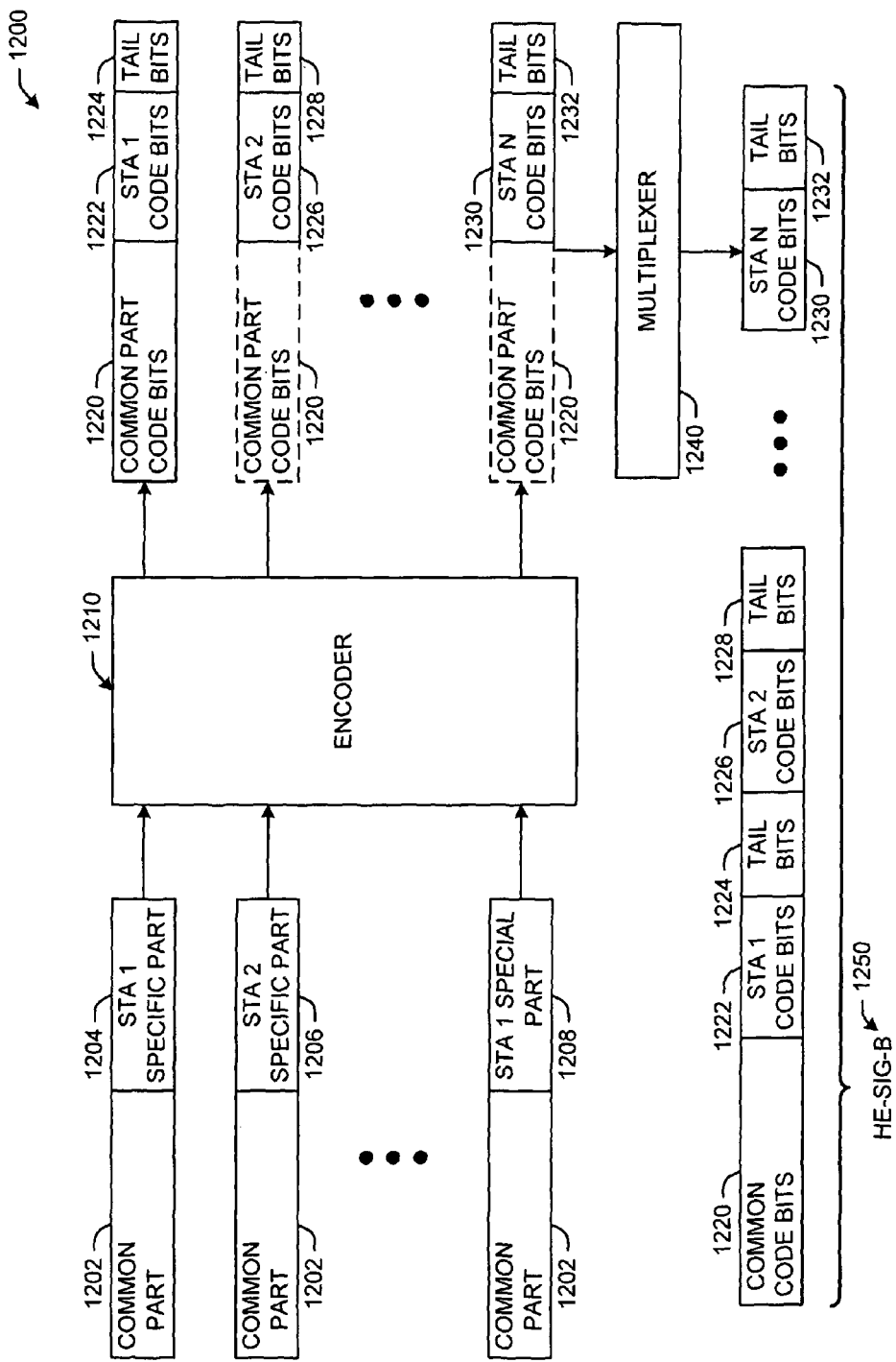
FIG. 12 depicts a simplified block diagram illustrating an example mechanism for generating HE-SIG-B code bits with tail bits at the end of each STA specific part of a signaling field of a preamble of a PPDU, in accordance with example embodiments of the disclosure.

FIG. 12 depicts a simplified block diagram illustrating an example mechanism 1200 for generating HE-SIG-B code bits 1250 with tail bits 1224, 1228, 1232 at the end of each STA specific part 1222, 1226, 1230 of a signaling field of a preamble of a PPDU, in accordance with example embodiments of the disclosure. The common part 1202 of the HE-SIG-B may be concatenated with each of the STA specific parts 1204, 1206, 1208 and then provided to an encoder 1210 for the purposes of encoding. The encoding may use, for example, a convolution code. The convolution encoding may be any suitable convolution encoding scheme. In some cases, the convolution code may be error-correcting code. Furthermore, the convolution code may facilitate trellis-type decoding, such as by using the Viterbi algorithm. The convolution code used may be a finite impulse response (FIR) or a recursive convolution code, in accordance with example embodiments of the disclosure.

The encoder may encode the common part 1202 along with each of the STA specific parts 1204, 1206, 1208 to generate code bits for the common part 1220 along with STA specific code bits 1222, 1226, 1230, along with tail bits 1224, 1228, 1232 at the end of each of the STA specific code bits. It will be appreciated that due to the nature of convolution code-based encoding, the code bits of the STA specific parts may be based at least in part on the common part 1202 of the HE-SIG-B. As a result, the common part and each of the STA specific parts may be encoded together, even though only one or two copies of the common part code bits may be transmitted by the AP 110 to the STAs 120, 130, 140. In other words, the code bits for each of the STA specific parts may be encoded as if the common part immediately preceded each of the STA specific parts and are to be encoded as a single stream of code bits representing both the common part and the STA specific part. Indeed, the tail bits 1224, 1228, 1232 may also be determined based at least in part on the STA specific code bits 1222, 1226, 1230, which in turn may depend in part on the common part code bits 1220. As discussed, the tail bits may be provided to reset the state of the decoder on the STA side to an initial state where the decoder may be ready to decode additional code bits that are provided to it. In some embodiment, the tail bits may not be generated if tail biting convolutional code is used. Even so, the channel encoding of the concatenated common and specific part may still be applied. For example, in some embodiments, the particular set of station specific code bits do not have tail bits and the code bits are based at least in part on both the common part information bits and the particular set of station specific information bits.

The common part code bits 1220 and each of the STA specific code bits 1222, 1226, 1230 along with the corresponding tail bits may be provided to a multiplexer 1240, that may be configured to rearrange the code bits to generate a HE-SIG-B signaling field 1250 of a preamble of a PPDU. In particular, the multiplexer 1240 may be configured to arrange the code bits with the common code bits 1220, followed by each of the STA specific code bits 1222, 1226, 1230 and their tail bits 1224, 1228, 1232. It will be appreciated that in some example embodiments, the common bits 1220 may be repeated prior to concatenating the STA specific code bits and the tail bits.

Figure 13:
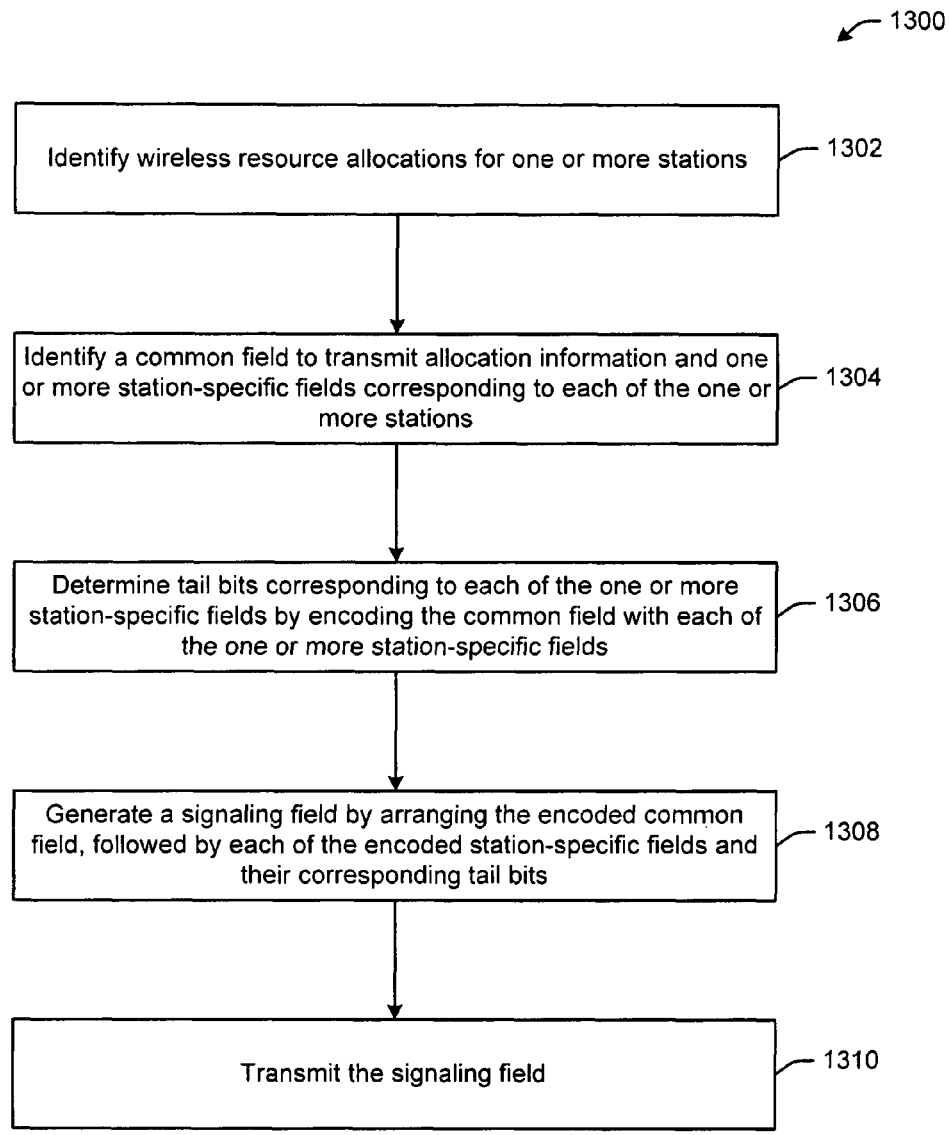
FIG. 13 depicts a flow diagram illustrating an example method for generating a signaling field with tail bits corresponding to both of STA specific code bits and common code bits, in accordance with example embodiments of the disclosure.

FIG. 13 depicts a flow diagram illustrating an example method 1300 for generating a signaling field with tail bits corresponding to both of STA specific code bits and common code bits, in accordance with example embodiments of the disclosure. This method 1300 may be performed by the AP 110 and the processor(s) 200 thereon.

At block 1302, a wireless resource allocation of one or more stations may be identified. This may entail identifying a group of tones and time span that the group of tones may be used in a dedicated manner by a particular STA, in some cases, such as when operating in OFDMA mode. In other cases, identifying resource allocations for one or more STAs may entail determining a MU partition, as well as streams (e.g., spatial allocations) for each of the STAs, such as in MU-MIMO mode. These resources may be allocated based on any variety of factors, including, for example an indication of the amount of data each of the STAs are to transmit and/or receive.

At block 1304, a common field to transmit allocation information and one or more station specific fields corresponding to each of the one or more stations may be identified. The common field may include a variety of information that may need to be provided to all of the STAs with which the AP 110 is to interact. This type of information may include a size of a channel, the subdivisions of the channel, indexing information of the particular channels, MCS to be used, etc. The STA specific fields may include information about the resources allocated to each of the specific STAs, such as tones (e.g., frequency blocks), MU partitions, spatial partitions, or the like. The common field and the STA specific fields may then be encoded. In some example embodiments, the encoding may be performed by a convolution code encoder. In some cases, each of the common field and the STA specific fields may each have their own tail bits. In other cases, the common field and each of the STA specific fields may have unified tail bits, such as at the end of each of the STA specific fields. As mentioned above, the tail bits may place the decoder on the STA side back to an initial state, such that the decoder may decode new data without errors.

At block 1306, tail bits corresponding to each of the one or more STA specific fields may be determined by encoding the common field with each of the STA specific fields. By doing so, there may not be any tail bits at the end of the common part of the He-SIG-B. Instead'all of the tail bits may be at the end of each of the STA specific parts of the HE-SIG-B. By not having tail bits at the end of the common part of the HE-SIG-B, there may be less overhead in the preamble of a PPDU.

At block 1308, a signaling field may be generated by arranging the encoded common field, followed by each of the encoded STA specific fields and their corresponding tail bits. The signaling field, as generated here, may be a HE-SIG-B field that is to part of a preamble of a PPDU. At block 1310, the signaling field may be transmitted. The transmission of the signaling field may be as part of a PPDU. The signaling field transmission may be such that it is to be received by one or more STAs.

It should be noted, that the method 1300 may be modified in various ways in accordance with certain embodiments of the disclosure. For example, one or more operations of method 1300 may be eliminated or executed out of order in other embodiments of the disclosure. Additionally, other operations may be added to method 1300 in accordance with other embodiments of the disclosure.

Figure 14:
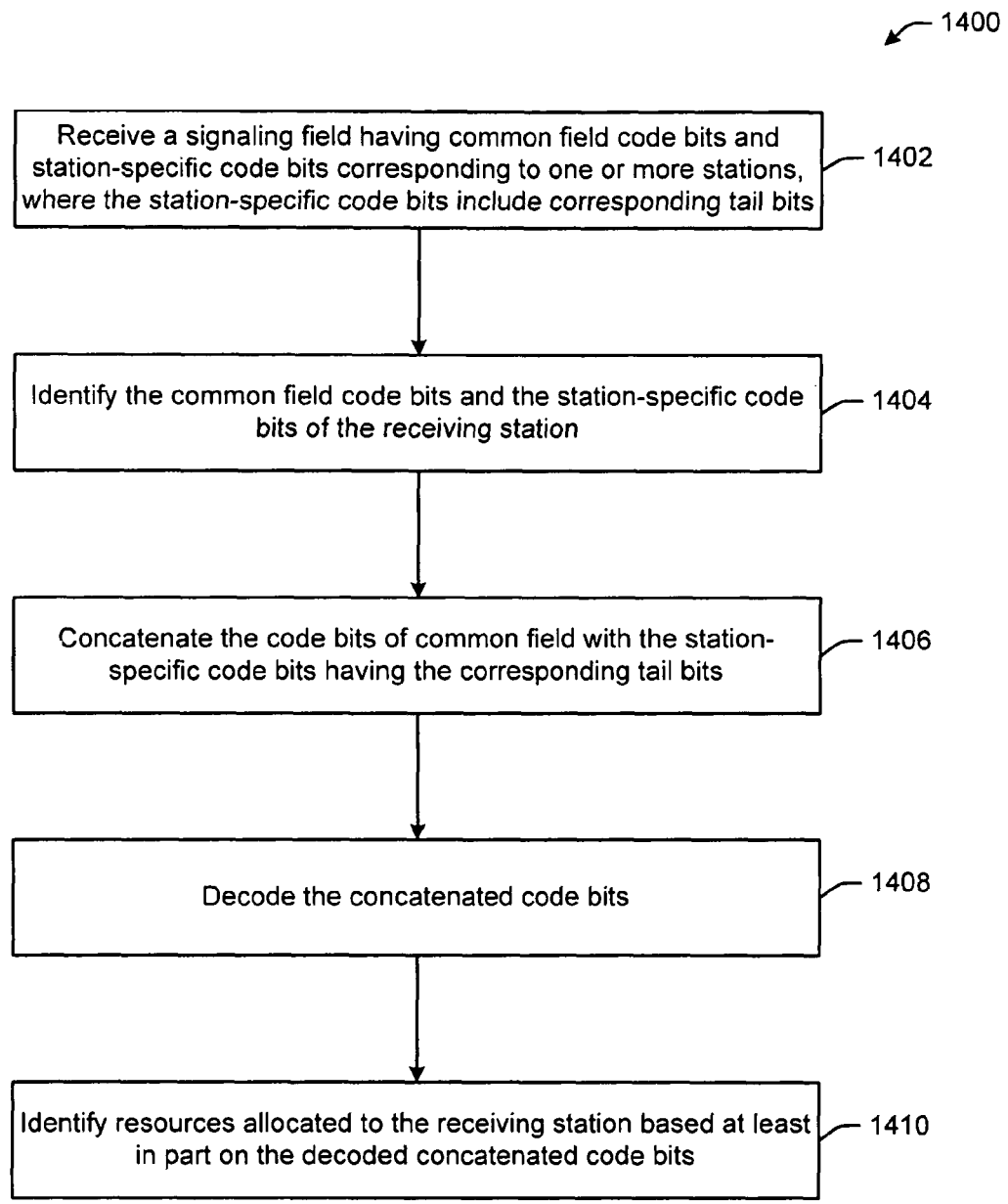
FIG. 14 depicts a flow diagram illustrating an example method for determining resources allocated to a STA based at least in part on a signaling field with tail bits corresponding to both of STA specific code bits and common code bits, in accordance with example embodiments of the disclosure.

FIG. 14 depicts a flow diagram illustrating an example method for determining resources allocated to a STA based at least in part on a signaling field with tail bits corresponding to both of STA specific code bits and common code bits, in accordance with example embodiments of the disclosure. The method 1400 may be performed by one or more STAs and the processor(s) 300 thereon.

At block 1402, a signaling field having an encoded common field and one or more station specific fields may be received, where each station specific field has corresponding tail bits. This signaling field may be received via the antenna 122 and/or transceiver 304 of the receiving STA. The signaling field may be similar to the signaling field transmitted by the processes of method 1300 of FIG. 13. The signaling field may be a HE-SIG-B of a preamble of a PPDU and may indicate resources allocated to the receiving STA.

At block 1404, code bits for the common field and code bits for the station specific field may be identified. The common field code bits may be identified based on information determined by the processor(s) 300 based on parts of the preamble (e.g., L-SIG, HE-SIG-A, etc.) that may have preceded the HE-SIG-B signaling field. The common field may indicate any variety of information therein that may be used by more than one and/or all of the STAs with which the AP 110 may communicate. The STA that receives the signaling field (e.g., the HE-SIG-B as part of a preamble and a full PPDU) may have an identifier for itself. This identifier, in some example embodiments, may be a fixed identifier of the STA. In other example embodiments, the identifier may be assigned and/or determined by or in interacting with the AP 110. In some example embodiments, the identifier may be a partial access identification (PAID) or station identification (STAID). This PAID may be assigned to each of the STAs, by the AP 110, during one or more handshaking procedures, prior to assignment of resources. Once the STA receiving the signaling field and performing this method 1100 has self-identification, it can identify its STA specific portion by recognizing its own identifier. For example, a STA, after identifying a common portion of the signaling field may identify its own PAID within the STA specific part of the signaling field and then may determine the code bits following the PAID (e.g., a predetermined length and/or until the next PAID) as its STA specific code bits.

At block 1406, the code bits of the common field and the station specific code bits with corresponding tail bits may be concatenated. At block 1408, the concatenated code bits may be decoded. The concatenated code bits may be provided to a decoder, such as a convolution code decoder (e.g., Viterbi decoder) for the purposes of decoding the string of code bits. Since the common part code bits do not have any tail bits, the common part code bits and the STA specific part code bits for the receiving STA are to be decoded in sequence. At block 1410, resources allocated to the STA may be identified based at least in part on the decoded concatenated code bits.

In various embodiments, a receiver may not have the station ID until the code bits are decoded. The code bits for a specific part can be determined by the code bits' location in the preamble. For example, the common block can have a fixed length; each specific block can also have a fixed length. Each specific block may have information specific for one or two stations. The receiver can concatenate the code bits of the common block and the code bits of each specific block for decoding. After decoding, the receiver can check the decoded station ID in the decoded bits.

In various embodiments, the order of encoding and decoding the common part and specific part can be exchanged. In some embodiments, for example, the common part can be go first and the specific part follows in the encoding/decoding process. The common and specific parts can be regarded as being symmetric from the encoding/decoding perspective. Namely, the specific part can goes first and the common part follows. The tail bits are appended to the common part. The first few bits e.g. 6 bits of the common part are used to encode the last few bits e.g. 6 bits of the specific parts. The code bits for the common parts can be sent only once but used for the decoding of each specific block. The tail bits of each specific block can be saved by using the first few bits of the common part to finish the encoding of all specific part bits. The CRC for the specific part and the common part can be placed in the specific part such that the common may not need a separate CRC.

It should be noted, that the method 1400 may be modified in various ways in accordance with certain embodiments of the disclosure. For example, one or more operations of method 1400 may be eliminated or executed out of order in other embodiments of the disclosure. Additionally, other operations may be added to method 1400 in accordance with other embodiments of the disclosure.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "may," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a user device, a station (STA), a wired or wireless router, a wired or wireless modem, a video device, an audio device, an audio-video (AN) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Orthogonal Frequency-Division Multiple Access (OFDMA), Radio Frequency (RF), Infra-Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

According to example embodiments of the disclosure, there may be a computer-readable non-transitory storage medium that contains instructions, which when executed by one or more processors result in performing operations comprising: receiving a wireless communication preamble structure comprising a high-efficiency signal field, wherein the high-efficiency signal fields comprises at least a common portion having common part code bits and one or more station specific parts having corresponding one or more sets of station specific code bits; identifying an identifier of a station; determining, based at least in part on the identifier, a particular set of station specific code bits from the one or more sets of code bits; identifying a first set of cyclic redundancy check (CRC) bits corresponding to the particular set of station specific code bits, wherein the first set of CRC bits are received with the wireless communications preamble structure, and wherein the first set of CRC bits are based at least in part on both the common part code bits and the particular set of station specific code bits; determining, based at least in part on the common part code bits and the particular set of station specific code bits, a second set of CRC bits; comparing the second set of code bits to the first set of code bits to identify a match between the first set of CRC bits and the second set of CRC bits; and determine, based at least in part on the match, that the common part code bits and the particular set of station specific code bits are received in an error-free state. In example embodiments, the wireless communication preamble structure is part of a physical layer convergence protocol data unit (PPDU). In further embodiments, the identifier of the station is a partial identifier (PAID). In still further example embodiments, the operations further comprise: decoding the common part code bits and the particular set of station specific code bits; identifying, based at least in part on the decoded common part code bits and the decoded particular set of station specific code bits, a resource allocation; and transmitting data according to the resource allocation. Further still, decoding the common part code bits comprises applying the common part code bits to a convolution code decoder. In additional example embodiments, determining the second set of CRC bits comprises: concatenating the common part code bits with the particular set of station specific code bits; and perform a CRC function on the concatenated common part code bits and particular set of station specific code bits. In yet further example embodiments, the particular set of station specific code bits include one or more tail bits, wherein the one or more tail bits are based at least in part on both the common part code bits and the particular set of station specific code bits.

According to example embodiments, there may be a wireless device. The wireless device, comprising: at least one antenna configured to transmit and receive wireless signals; a transceiver communicatively coupled to the at least one antenna; at least one memory that stores computer-executable instructions; and at least one processor configured to access the at least one memory, wherein the at least one processor is communicatively coupled to the transceiver and is configured to execute the computer-executable instructions to: receive a wireless communication preamble structure comprising a high-efficiency signal field, wherein the high-efficiency signal fields comprises at least a common part having common part code bits, one or more station specific parts having corresponding one or more sets of station specific code bits, and one or more sets of cyclic redundancy check (CRC) bits corresponding to each of the one or more sets of station specific code bits, wherein each of the CRC bits are based at least in part on its corresponding respective set of station specific code bits and the common part code bits; identify a particular set of station specific code bits and its corresponding particular set of CRC bits; perform a CRC on the common part code bits and the particular set of station specific code bits to generate a set of verification CRC bits; compare the verification CRC bits to the particular set of CRC bits; and determine, based at least in part on the comparison, that an error has occurred in the receipt of the common part code bits or the particular set of station specific code bits. In example embodiments, the at least one processor is further configured to execute the computer-executable instructions to: generate a message indicating the error; transmit the message; and receive a retransmitted wireless communication preamble structure. In further example embodiments, the at least one processor is configured to execute the computer-executable instructions to identify a particular set of station specific code bits further comprises the at least one processor is configured to: identify a partial identifier (PAID) of the wireless device; parse the one or more sets of station specific code bits to identify the PAID; and determine that a predetermined number of bits following the PAID are the station specific code bits. In still further example embodiments, the at least one processor is configured to determine, based at least in part on the comparison, that an error has occurred further comprises the at least one processor is configured to determine that the particular set of CRC bits do not match the verification CRC bits. In further embodiments, the identifying a particular set of station specific code bits can further include the at least one processor being configured to: determine the code bit length of the common part and the code bit length of each set of the station specific code bits, e.g. based on information in the previous portion of the preamble, e.g. HE-SIG-A.

In example embodiments of the disclosure, a computer-readable non-transitory storage medium that contains instructions, which when executed by one or more processors result in performing operations comprising: identifying a station and resource allocation information of the station; generating, based at least in part on the resource allocation information, common part code bits of a high-efficiency signal field and station specific code bits of the high-efficiency signal field; determining, based at least in part on the common part code bits and the station specific part code bits, a set of cyclic redundancy check (CRC) bits; and generating, based at least in part on the common part code bits, the station specific code bits, and the CRC bits, the high-efficiency signal field. In further embodiments, the operations further comprise: incorporating the high-efficiency signal filed in a physical layer convergence protocol data unit (PPDU); and transmit the PPDU. Furthermore, in some cases, identifying a station comprises receiving a request from the station for the resource allocation. In still further example embodiments, the common part code bits include a plurality of tail bits. In yet further example embodiments, the station is a first station, the resource allocation information is a first resource allocation information, the station specific code bits are a first set of station specific code bits, and the CRC bits are a first set of CRC bits, and wherein the operations further comprise: identifying a second station and second resource allocation information of the second station; generating, based at least in part on the second resource allocation information, a second set of station specific code bits; and determining, based at least in part on the second set of station specific code bits and the common par code bits, a second set of CRC bits corresponding to the second set of station specific code bits, wherein the high-efficiency signal field is further based at least in part on the second set of station specific code bits and the second set of CRC bits.

Example embodiments of the disclosure may include a wireless access point device. The wireless access point device, comprising: at least one antenna configured to transmit and receive wireless signals; a transceiver communicatively coupled to the at least one antenna; at least one memory that stores computer-executable instructions; and at least one processor configured to access the at least one memory, wherein the at least one processor is communicatively coupled to the transceiver and is configured to execute the computer-executable instructions to: generate common part code bits corresponding to one or more station devices; generate one or more respective sets of station specific code bits corresponding to each of the one or more station devices; determine respective sets of cyclic redundancy check (CRC) bits corresponding to each of the one or more station devices, wherein each of the sets of CRC bits is based at least in part on the corresponding set of station specific code bits and the common code bits; and generate a signal field based at least in part on the common part code bits, each of the sets of station specific code bits, and each of the sets of CRC bits. In further example embodiments, the at least one processor is configured to generate common part code bits corresponding to one or more station devices comprises the at least one processor is configured to: determine common part information, wherein the common part information is relevant to more than one of the one or more station devices; and encode the common part information. In still further example embodiments, the at least one processor is further configured to transmit the signal field as part of a physical layer convergence protocol data unit (PPDU) via the transceiver and the at least one antenna. In yet further example embodiments, the at least one processor is further configured to identify the one or more station devices based at least in part on receiving a request from each of the station devices for the resource allocation.

In one aspect, a device is described. The device can include at least one antenna configured to transmit and receive wireless signals; a transceiver communicatively coupled to the at least one antenna; at least one memory that stores computer-executable instructions; and at least one processor configured to access the at least one memory, wherein the at least one processor is communicatively coupled to the transceiver and is configured to execute the computer-executable instructions. The instructions can receive a wireless communication preamble structure comprising a high-efficiency signal field, wherein the high-efficiency signal fields comprises at least a common portion having common part code bits and one or more station specific parts having corresponding one or more sets of station specific code bits; identify an identifier of a station; determine, based at least in part on the identifier, a particular set of station specific code bits from the one or more sets of code bits; identify a first set of cyclic redundancy check (CRC) bits corresponding to the particular set of station specific code bits, wherein the first set of CRC bits are received with the wireless communications preamble structure, and wherein the first set of CRC bits are based at least in part on both the common part code bits and the particular set of station specific code bits; determine, based at least in part on the common part code bits and the particular set of station specific code bits, a second set of CRC bits; compare the second set of code bits to the first set of code bits to identify a match between the first set of CRC bits and the second set of CRC bits; and determine, based at least in part on the match, that the common part code bits and the particular set of station specific code bits are received in an error-free state.

In one aspect, the wireless communication preamble structure is part of a physical layer convergence protocol data unit (PPDU). The identifier of the station is at least one of a partial identifier (PAID) or a station identification (STAID). The at least one processor can further be configured to execute the computer-executable instructions to: decode the common part code bits and the particular set of station specific code bits; identify, based at least in part on the decoded common part code bits and the decoded particular set of station specific code bits, a resource allocation; and transmit or receive data according to the resource allocation.

In another aspect, the at least one processor being configured to execute the computer-executable instructions to decode the common part code bits further comprises applying the common part code bits to a convolution code decoder. Moreover, the at least one processor being configured to execute the computer-executable instructions to determining the second set of CRC bits further comprises: concatenating the common part decoded bits with the particular set of station specific decoded bits; and performing a CRC function on the concatenated common part code bits and particular set of station specific code bits.

In another aspect, the particular set of station specific code bits include one or more tail bits, wherein the one or more tail bits are based at least in part on both the common part code bits and the particular set of station specific code bits.

In a further aspect, a method is described; the method can include: receiving a wireless communication preamble structure comprising a high-efficiency signal field, wherein the high-efficiency signal fields comprises at least a common portion having common part code bits and one or more station specific parts having corresponding one or more sets of station specific code bits; identifying an identifier of a station; determining, based at least in part on the identifier, a particular set of station specific code bits from the one or more sets of code bits; identifying a first set of cyclic redundancy check (CRC) bits corresponding to the particular set of station specific code bits, wherein the first set of CRC bits are received with the wireless communications preamble structure, and wherein the first set of CRC bits are based at least in part on both the common part code bits and the particular set of station specific code bits; determining, based at least in part on the common part code bits and the particular set of station specific code bits, a second set of CRC bits; comparing the second set of code bits to the first set of code bits to identify a match between the first set of CRC bits and the second set of CRC bits; and determining, based at least in part on the match, that the common part code bits and the particular set of station specific code bits are received in an error-free state.

In one aspect, the wireless communication preamble structure is part of a physical layer convergence protocol data unit (PPDU). The identifier of the station is at least one of a partial identifier (PAID) or a station identification (STAID). The operations further comprise: decoding the common part code bits and the particular set of station specific code bits; identifying, based at least in part on the decoded common part code bits and the decoded particular set of station specific code bits, a resource allocation; and transmitting or receiving data according to the resource allocation.

In another aspect, the decoding the common part code bits comprises applying the common part code bits to a convolution code decoder. The determining the second set of CRC bits comprises: concatenating the common part decoded bits with the particular set of station specific decoded bits; and performing a CRC function on the concatenated common part code bits and particular set of station specific code bits. In another aspect, the particular set of station specific code bits include one or more tail bits, wherein the one or more tail bits are based at least in part on both the common part code bits and the particular set of station specific code bits.

In a further aspect, an apparatus is described, the apparatus including: a means for receiving a wireless communication preamble structure comprising a high-efficiency signal field, wherein the high-efficiency signal fields comprises at least a common portion having common part code bits and one or more station specific parts having corresponding one or more sets of station specific code bits; a means for identifying an identifier of a station; a means for determining, based at least in part on the identifier, a particular set of station specific code bits from the one or more sets of code bits; a means for identifying a first set of cyclic redundancy check (CRC) bits corresponding to the particular set of station specific code bits, wherein the first set of CRC bits are received with the wireless communications preamble structure, and wherein the first set of CRC bits are based at least in part on both the common part code bits and the particular set of station specific code bits; a means for determining, based at least in part on the common part code bits and the particular set of station specific code bits, a second set of CRC bits; a means for comparing the second set of code bits to the first set of code bits to identify a match between the first set of CRC bits and the second set of CRC bits; and a means for determining, based at least in part on the match, that the common part code bits and the particular set of station specific code bits are received in an error-free state.

The wireless communication preamble structure is part of a physical layer convergence protocol data unit (PPDU). The identifier of the station is at least one of a partial identifier (PAID) or a station identification (STAID). The apparatus can further include a means for decoding the common part code bits and the particular set of station specific code bits; a means for identifying, based at least in part on the decoded common part code bits and the decoded particular set of station specific code bits, a resource allocation; and a means for transmitting or receiving data according to the resource allocation.

The means for decoding the common part code bits comprises a means for applying the common part code bits to a convolution code decoder. The means for determining the second set of CRC bits comprises: a means for concatenating the common part decoded bits with the particular set of station specific decoded bits; and a means for perform a CRC function on the concatenated common part code bits and particular set of station specific code bits.

The particular set of station specific code bits include one or more tail bits, wherein the one or more tail bits are based at least in part on both the common part code bits and the particular set of station specific code bits.

In one aspect, a computer-readable non-transitory storage medium that contains instructions is described. When the instruction are executed by one or more processors result in performing operations comprising: receiving a wireless communication preamble structure comprising a high-efficiency signal field, wherein the high-efficiency signal fields comprises at least a common part having common part code bits, one or more station specific parts having corresponding one or more sets of station specific code bits, and one or more sets of cyclic redundancy check (CRC) bits corresponding to each of the one or more sets of station specific code bits, wherein each of the CRC bits are based at least in part on its corresponding respective set of station specific code bits and the common part code bits; identifying a particular set of station specific code bits and its corresponding particular set of CRC bits; performing a CRC on the common part code bits and the particular set of station specific code bits to generate a set of verification CRC bits; comparing the verification CRC bits to the particular set of CRC bits; and determining, based at least in part on the comparison, that an error has occurred in the receipt of the common part code bits or the particular set of station specific code bits.

The operations further comprise: generating a message indicating the error; transmitting the message; and receiving a retransmitted wireless communication preamble structure.

The identifying a particular set of station specific code bits further comprise: identifying at least one of a partial identifier (PAID) or a station identification (STAID) of the wireless device; parsing the one or more sets of station specific code bits to identify the PAID; and determining that a predetermined number of bits following the PAID are the station specific code bits.

The determining, based at least in part on the comparison, that an error has occurred further comprises the at least one processor is configured to determine that the particular set of CRC bits do not match the verification CRC bits.

In one aspect, a method is described comprising: receiving a wireless communication preamble structure comprising a high-efficiency signal field, wherein the high-efficiency signal fields comprises at least a common part having common part code bits, one or more station specific parts having corresponding one or more sets of station specific code bits, and one or more sets of cyclic redundancy check (CRC) bits corresponding to each of the one or more sets of station specific code bits, wherein each of the CRC bits are based at least in part on its corresponding respective set of station specific code bits and the common part code bits; identifying a particular set of station specific code bits and its corresponding particular set of CRC bits; performing a CRC on the common part code bits and the particular set of station specific code bits to generate a set of verification CRC bits; comparing the verification CRC bits to the particular set of CRC bits; and determining, based at least in part on the comparison, that an error has occurred in the receipt of the common part code bits or the particular set of station specific code bits.

The method can include: generating a message indicating the error; transmitting the message; and receiving a retransmitted wireless communication preamble structure. The identifying a particular set of station specific code bits further comprises: identifying at least one of a partial identifier (PAID) or a station identification (STAID) of the wireless device; parsing the one or more sets of station specific code bits to identify the PAID; and determining that a predetermined number of bits following the PAID are the station specific code bits.

The method can further include determining, based at least in part on the comparison, that an error has occurred further comprises the at least one processor is configured to determine that the particular set of CRC bits do not match the verification CRC bits.

In one aspect, an apparatus is described, the apparatus comprising: a means for receiving a wireless communication preamble structure comprising a high-efficiency signal field, wherein the high-efficiency signal fields comprises at least a common part having common part code bits, one or more station specific parts having corresponding one or more sets of station specific code bits, and one or more sets of cyclic redundancy check (CRC) bits corresponding to each of the one or more sets of station specific code bits, wherein each of the CRC bits are based at least in part on its corresponding respective set of station specific code bits and the common part code bits; a means for identifying a particular set of station specific code bits and its corresponding particular set of CRC bits; a means for performing a CRC on the common part code bits and the particular set of station specific code bits to generate a set of verification CRC bits; a means for comparing the verification CRC bits to the particular set of CRC bits; and a means for determining, based at least in part on the comparison, that an error has occurred in the receipt of the common part code bits or the particular set of station specific code bits.

The apparatus further comprises: a means for generating a message indicating the error; a means for transmitting the message; and a means for receiving a retransmitted wireless communication preamble structure. The apparatus further comprises: a means for identifying at least one of a partial identifier (PAID) or a station identification (STAID) of the wireless device;
a means for parsing the one or more sets of station specific code bits to identify the PAID; and a means for determining that a predetermined number of bits following the PAID are the station specific code bits.

The apparatus further includes a means for determining, based at least in part on the comparison, that an error has occurred further comprises the at least one processor is configured to determine that the particular set of CRC bits do not match the verification CRC bits.

In one aspect, a wireless device is described, comprising: at least one antenna configured to transmit and receive wireless signals; a transceiver communicatively coupled to the at least one antenna; at least one memory that stores computer-executable instructions; and at least one processor configured to access the at least one memory, wherein the at least one processor is communicatively coupled to the transceiver and is configured to execute the computer-executable instructions to: identify a station and resource allocation information of the station; generate, based at least in part on the resource allocation information, common part code bits of a high-efficiency signal field and station specific code bits of the high-efficiency signal field; determine, based at least in part on the common part code bits and the station specific part code bits, a set of cyclic redundancy check (CRC) bits; and generate, based at least in part on the common part code bits, the station specific code bits, and the CRC bits, the high-efficiency signal field.

The operations further comprise: incorporating the high-efficiency signal filed in a physical layer convergence protocol data unit (PPDU); and transmit the PPDU. Identifying a station comprises receiving a request from the station for the resource allocation. The common part code bits include a plurality of tail bits.

In one example, the station is a first station, the resource allocation information is a first resource allocation information, the station specific code bits are a first set of station specific code bits, and the CRC bits are a first set of CRC bits, and wherein the at least one process configured to execute the computer-executable instructions further comprise: identifying a second station and second resource allocation information of the second station; generating, based at least in part on the second resource allocation information, a second set of station specific code bits; and determining, based at least in part on the second set of station specific code bits and the common par code bits, a second set of CRC bits corresponding to the second set of station specific code bits, wherein the high-efficiency signal field is further based at least in part on the second set of station specific code bits and the second set of CRC bits.

In one aspect, a method is described, comprising: identifying a station and resource allocation information of the station; generating, based at least in part on the resource allocation information, common part code bits of a high-efficiency signal field and station specific code bits of the high-efficiency signal field; determining, based at least in part on the common part code bits and the station specific part code bits, a set of cyclic redundancy check (CRC) bits; and generating, based at least in part on the common part code bits, the station specific code bits, and the CRC bits, the high-efficiency signal field.

The operations further comprise: incorporating the high-efficiency signal filed in a physical layer convergence protocol data unit (PPDU); and transmitting the PPDU.

The identifying a station comprises receiving a request from the station for the resource allocation. The common part code bits include a plurality of tail bits. The station is a first station, the resource allocation information is a first resource allocation information, the station specific code bits are a first set of station specific code bits, and the CRC bits are a first set of CRC bits, and wherein the operations further comprise: identifying a second station and second resource allocation information of the second station; generating, based at least in part on the second resource allocation information, a second set of station specific code bits; and determining, based at least in part on the second set of station specific code bits and the common par code bits, a second set of CRC bits corresponding to the second set of station specific code bits, wherein the high-efficiency signal field is further based at least in part on the second set of station specific code bits and the second set of CRC bits.

The apparatus can include: a means for identifying a station and resource allocation information of the station; a means for generating, based at least in part on the resource allocation information, common part code bits of a high-efficiency signal field and station specific code bits of the high-efficiency signal field; a means for determining, based at least in part on the common part code bits and the station specific part code bits, a set of cyclic redundancy check (CRC) bits; and a means for generating, based at least in part on the common part code bits, the station specific code bits, and the CRC bits, the high-efficiency signal field.

The apparatus can further comprise: a means for incorporating the high-efficiency signal filed in a physical layer convergence protocol data unit (PPDU); and a means for transmitting the PPDU.

The means for identifying a station comprises a means for receiving a request from the station for the resource allocation. The common part code bits include a plurality of tail bits. The station is a first station, the resource allocation information is a first resource allocation information, the station specific code bits are a first set of station specific code bits, and the CRC bits are a first set of CRC bits, and wherein apparatus further comprises: a means for identifying a second station and second resource allocation information of the second station; a means for generating, based at least in part on the second resource allocation information, a second set of station specific code bits; and a means for determining, based at least in part on the second set of station specific code bits and the common par code bits, a second set of CRC bits corresponding to the second set of station specific code bits, wherein the high-efficiency signal field is further based at least in part on the second set of station specific code bits and the second set of CRC bits.

A computer-readable non-transitory storage medium that contains instructions, which when executed by one or more processors result in performing operations comprising: generating common part code bits corresponding to one or more station devices; generating one or more respective sets of station specific code bits corresponding to each of the one or more station devices; determining respective sets of cyclic redundancy check (CRC) bits corresponding to each of the one or more station devices, wherein each of the sets of CRC bits is based at least in part on the corresponding set of station specific code bits and the common code bits; and generating a signal field based at least in part on the common part code bits, each of the sets of station specific code bits, and each of the sets of CRC bits.

The generating common part code bits corresponding to one or more station devices further comprises: determining common part information, wherein the common part information is relevant to more than one of the one or more station devices; and encoding the common part information.

The operations further comprise transmitting the signal field as part of a physical layer convergence protocol data unit (PPDU) via the transceiver and the at least one antenna. The operations further comprise identifying the one or more station devices based at least in part on receiving a request from each of the station devices for the resource allocation.

A method comprises: generating common part code bits corresponding to one or more station devices; generating one or more respective sets of station specific code bits corresponding to each of the one or more station devices; determining respective sets of cyclic redundancy check (CRC) bits corresponding to each of the one or more station devices, wherein each of the sets of CRC bits is based at least in part on the corresponding set of station specific code bits and the common code bits; and generating a signal field based at least in part on the common part code bits, each of the sets of station specific code bits, and each of the sets of CRC bits.

The method further comprises: determining common part information, wherein the common part information is relevant to more than one of the one or more station devices; and encoding the common part information.

The method further comprises transmitting the signal field as part of a physical layer convergence protocol data unit (PPDU) via the transceiver and the at least one antenna. The method of claim further comprising identifying the one or more station devices based at least in part on receiving a request from each of the station devices for the resource allocation.

In one aspect, an apparatus comprises: a means to generate common part code bits corresponding to one or more station devices; a means to generate one or more respective sets of station specific code bits corresponding to each of the one or more station devices; a means to determine respective sets of cyclic redundancy check (CRC) bits corresponding to each of the one or more station devices, wherein each of the sets of CRC bits is based at least in part on the corresponding set of station specific code bits and the common code bits; and a means to generate a signal field based at least in part on the common part code bits, each of the sets of station specific code bits, and each of the sets of CRC bits.

The apparatus further comprises a means to determine common part information, wherein the common part information is relevant to more than one of the one or more station devices; and a means to encode the common part information.

The apparatus of claim further comprises a means to transmit the signal field as part of a physical layer convergence protocol data unit (PPDU) via the transceiver and the at least one antenna.

The apparatus further comprises a means to identify the one or more station devices based at least in part on receiving a request from each of the station devices for the resource allocation.

In one aspect, a device is described, comprising: at least one antenna configured to transmit and receive wireless signals; a transceiver communicatively coupled to the at least one antenna; at least one memory that stores computer-executable instructions; and at least one processor configured to access the at least one memory, wherein the at least one processor is communicatively coupled to the transceiver and is configured to execute the computer-executable instructions to: receive a wireless communication preamble structure comprising a high-efficiency signal field, wherein the high-efficiency signal field comprises at least a common part having common part code bits and one or more station specific parts having corresponding one or more sets of station specific code bits; determine the common part code bits; identify an identifier of a station; determine a particular set of station specific code bits from the one or more sets of station specific code bits; decode the common part code bits and the particular set of station specific code bits, wherein the particular set of station specific code bits conclude with a plurality of tail bits; identify, based at least in part on the decoded common part code bits, the station specific part code bits, and the identifier, a resource allocation of the station.

Example embodiments of the disclosure may include the wireless communication preamble structure is part of a physical layer convergence protocol data unit (PPDU). The identifier of the station is a station identifier (STAID). The decoding the common part code bits and the station specific code bits after the common part code bits further comprises: concatenating the particular set of station specific code bits after the common part code bits; and applying the concatenated common part code bits and the particular set of station specific code bits to a convolution code decoder, wherein the plurality of tail bits place the convolution code decoder in an ending state to decode further code bits. The common part code bits do not conclude with any tail bits. There is at least a second set of station specific code bits between the common part code bits and the particular set of code bits. The particular set of station specific code bits include a plurality of cyclic redundancy check (CRC) bits, wherein the plurality of CRC bits are based at least in part on both the common part code bits and the particular set of station specific code bits.

In one aspect a method is described, comprising: receiving a wireless communication preamble structure comprising a high-efficiency signal field, wherein the high-efficiency signal field comprises at least a common part having common part code bits and one or more station specific parts having corresponding one or more sets of station specific code bits; determining the common part code bits; identifying an identifier of a station; determining a particular set of station specific code bits from the one or more sets of station specific code bits; decoding the common part code bits and the particular set of station specific code bits, wherein the particular set of station specific code bits conclude with a plurality of tail bits; identifying, based at least in part on the decoded common part code bits, the station specific part code bits, and the identifier, a resource allocation of the station. The wireless communication preamble structure is part of a physical layer convergence protocol data unit (PPDU). The identifier of the station is a station identifier (STAID). Decoding the common part code bits and the station specific code bits after the common part code bits further comprises: concatenating the particular set of station specific code bits after the common part code bits; and applying the concatenated common part code bits and the particular set of station specific code bits to a convolution code decoder, wherein the plurality of tail bits place the convolution code decoder in an ending state to decode further code bits.

The common part code bits do not conclude with any tail bits. There is at least a second set of station specific code bits between the common part code bits and the particular set of code bits. The particular set of station specific code bits include a plurality of cyclic redundancy check (CRC) bits, wherein the plurality of CRC bits are based at least in part on both the common part code bits and the particular set of station specific code bits.

In one aspect, an apparatus is described, comprising: a means for receiving a wireless communication preamble structure comprising a high-efficiency signal field, wherein the high-efficiency signal field comprises at least a common part having common part code bits and one or more station specific parts having corresponding one or more sets of station specific code bits; a means for determining the common part code bits; a means for identifying an identifier of a station;

a means for determining a particular set of station specific code bits from the one or more sets of station specific code bits; a means for decoding the common part code bits and the particular set of station specific code bits, wherein the particular set of station specific code bits conclude with a plurality of tail bits; a means for identifying, based at least in part on the decoded common part code bits, the station specific part code bits, and the identifier, a resource allocation of the station. The wireless communication preamble structure is part of a physical layer convergence protocol data unit (PPDU). the identifier of the station is a station identifier (STAID). The means for decoding the common part code bits and the station specific code bits after the common part code bits further comprises: a means for concatenating the particular set of station specific code bits after the common part code bits; and a means for applying the concatenated common part code bits and the particular set of station specific code bits to a convolution code decoder, wherein the plurality of tail bits place the convolution code decoder in an ending state to decode further code bits.

Example embodiments of the disclosure may include the common part code bits not concluding with any tail bits. There is at least a second set of station specific code bits between the common part code bits and the particular set of code bits. The particular set of station specific code bits include a plurality of cyclic redundancy check (CRC) bits, wherein the plurality of CRC bits are based at least in part on both the common part code bits and the particular set of station specific code bits.

In one aspect a computer-readable non-transitory storage medium is described. The medium contains instructions, which when executed by one or more processors result in performing operations comprising: receiving a wireless communication preamble structure comprising a high-efficiency signal field, wherein the high-efficiency signal fields comprises at least a common part having common part code bits and one or more station specific parts corresponding to each of one or more sets of station specific code bits, wherein each of the one or more station specific part information bits terminate with a plurality of tail bits; identifying a particular set of station specific code bits; and decoding the common part code bits and the particular set of station specific code bits in succession, wherein the common part code bits and the particular set of station specific code bits are applied to a convolution code decoder, and wherein a final state of the decoder after decoding the common part code bits is to be maintained as an initial state of the decoder when decoding the particular set of station specific code bits.

Example embodiments of the disclosure may include the operating further comprising: identifying a resource allocation to the wireless device based at least in part on the decoded common part code bits and the decoded station specific code bits; and receiving or transmit data according to the resource allocation via the transceiver and the at least one antenna. The identifying a particular set of station specific code bits further comprises: identifying a partial identifier (PAID) of the wireless device; parsing the one or more sets of station specific code bits to identify the PAID; and determining that a predetermined number of bits following the PAID are the particular set of station specific code bits. There is at least a second set of station specific code bits between the common part code bits and the particular set of code bits.

In one aspect, a method is described, comprising: receiving a wireless communication preamble structure comprising a high-efficiency signal field, wherein the high-efficiency signal fields comprises at least a common part having common part code bits and one or more station specific parts corresponding to each of one or more sets of station specific code bits, wherein each of the one or more station specific part information bits terminate with a plurality of tail bits; identifying a particular set of station specific code bits; and decoding the common part code bits and the particular set of station specific code bits in succession, wherein the common part code bits and the particular set of station specific code bits are applied to a convolution code decoder, and wherein a final state of the decoder after decoding the common part code bits is to be maintained as an initial state of the decoder when decoding the particular set of station specific code bits. The method further comprises: identifying a resource allocation to the wireless device based at least in part on the decoded common part code bits and the decoded station specific code bits; and receiving or transmitting data according to the resource allocation via the transceiver and the at least one antenna.

The identifying a particular set of station specific code bits further comprises: identifying a partial identifier (PAID) of the wireless device; parsing the one or more sets of station specific code bits to identify the PAID; and determining that a predetermined number of bits following the PAID are the particular set of station specific code bits. There is at least a second set of station specific code bits between the common part code bits and the particular set of code bits.

In one aspect, an apparatus is described, the apparatus comprising: a means to receive a wireless communication preamble structure comprising a high-efficiency signal field, wherein the high-efficiency signal fields comprises at least a common part having common part code bits and one or more station specific parts corresponding to each of one or more sets of station specific code bits, wherein each of the one or more station specific part information bits terminate with a plurality of tail bits; a means to identify a particular set of station specific code bits; and a means to decode the common part code bits and the particular set of station specific code bits in succession, wherein the common part code bits and the particular set of station specific code bits are applied to a convolution code decoder, and wherein a final state of the decoder after decoding the common part code bits is to be maintained as an initial state of the decoder when decoding the particular set of station specific code bits.

The apparatus further comprises: a means to identify a resource allocation to the wireless device based at least in part on the decoded common part code bits and the decoded station specific code bits; and a means to receive or transmit data according to the resource allocation via the transceiver and the at least one antenna.

the means to identify a particular set of station specific code bits further comprises:

a means to identify a partial identifier (PAID) of the wireless device; a means to parse the one or more sets of station specific code bits to identify the PAID; and a means to determine that a predetermined number of bits following the PAID are the particular set of station specific code bits. There is at least a second set of station specific code bits between the common part code bits and the particular set of code bits.

In one aspect a device is described, the device comprising: at least one antenna configured to transmit and receive wireless signals; a transceiver communicatively coupled to the at least one antenna; at least one memory that stores computer-executable instructions; and at least one processor configured to access the at least one memory, wherein the at least one processor is communicatively coupled to the transceiver and is configured to execute the computer-executable instructions to: identify a station and resource allocation information of the station;

determine, based at least in part on the resource allocation information, common part information bits and station specific information bits; encode the common part information bits and the station specific information bits in succession to generate common part code bits and station specific code bits of a high-efficiency signal field, wherein the station specific code bits terminate with a plurality of tail bits; and generate, based at least in part on the common part code bits and the station specific code bits, the high-efficiency signal field.

The at least one processor is further configured to execute computer-executable instructions to: incorporate the high-efficiency signal filed in a physical layer convergence protocol data unit (PPDU); and initiate, via one or more antennas, the transmission of the PPDU. Identifying a station comprises receiving a request from the station for the resource allocation. The common part code bits do not include any tail bits. The station is a first station, the resource allocation information is a first resource allocation information, the station specific information bits are part of a first set of station specific information bits, the station specific code bits are part of a first set of station specific code bits, and the plurality of tail bits are a first plurality of tail bits, and wherein the at least one processor is further configured to execute computer-executable instructions to: identify a second station and second resource allocation information of the second station; determine, based at least in part on the resource allocation information, a second set of station specific information bits; and encode the common part information bits and the second set of station specific information bits in succession to generate a second set of station specific code bits of a high-efficiency signal field, wherein the second set of station specific code bits correspond to the second set of station specific information bits and the second set of station specific code bits terminate with a second plurality of tail bits, wherein generating the high-efficiency signal field comprises concatenating, in order, the common part code bits, the first set of station specific code bits, and the second set of station specific code bits.

In one aspect, a method is described, the method comprising: identifying a station and resource allocation information of the station; determining, based at least in part on the resource allocation information, common part information bits and station specific information bits; encoding the common part information bits and the station specific information bits in succession to generate common part code bits and station specific code bits of a high-efficiency signal field, wherein the station specific code bits terminate with a plurality of tail bits; and generating, based at least in part on the common part code bits and the station specific code bits, the high-efficiency signal field. The operations further comprise: incorporating the high-efficiency signal filed in a physical layer convergence protocol data unit (PPDU); and initiating, via one or more antennas, the transmission of the PPDU. Identifying a station comprises receiving a request from the station for the resource allocation. The common part code bits do not include any tail bits.

The station is a first station, the resource allocation information is a first resource allocation information, the station specific information bits are part of a first set of station specific information bits, the station specific code bits are part of a first set of station specific code bits, and the plurality of tail bits are a first plurality of tail bits, and wherein the method further comprises: identifying a second station and second resource allocation information of the second station; determining, based at least in part on the resource allocation information, a second set of station specific information bits; and encoding the common part information bits and the second set of station specific information bits in succession to generate a second set of station specific code bits of a high-efficiency signal field, wherein the second set of station specific code bits correspond to the second set of station specific information bits and the second set of station specific code bits terminate with a second plurality of tail bits, wherein generating the high-efficiency signal field comprises concatenating, in order, the common part code bits, the first set of station specific code bits, and the second set of station specific code bits.

In one aspect, an apparatus is described, the apparatus comprising: a means for identifying a station and resource allocation information of the station; a means for determining, based at least in part on the resource allocation information, common part information bits and station specific information bits; a means for encoding the common part information bits and the station specific information bits in succession to generate common part code bits and station specific code bits of a high-efficiency signal field, wherein the station specific code bits terminate with a plurality of tail bits; and a means for generating, based at least in part on the common part code bits and the station specific code bits, the high-efficiency signal field.

The apparatus further comprises: a means for incorporating the high-efficiency signal filed in a physical layer convergence protocol data unit (PPDU); and a means for initiating, via one or more antennas, the transmission of the PPDU. Identifying a station comprises receiving a request from the station for the resource allocation. The common part code bits do not include any tail bits.

The station is a first station, the resource allocation information is a first resource allocation information, the station specific information bits are part of a first set of station specific information bits, the station specific code bits are part of a first set of station specific code bits, and the plurality of tail bits are a first plurality of tail bits, and wherein the method further comprises: identifying a second station and second resource allocation information of the second station; determining, based at least in part on the resource allocation information, a second set of station specific information bits; and encoding the common part information bits and the second set of station specific information bits in succession to generate a second set of station specific code bits of a high-efficiency signal field, wherein the second set of station specific code bits correspond to the second set of station specific information bits and the second set of station specific code bits terminate with a second plurality of tail bits, wherein generating the high-efficiency signal field comprises concatenating, in order, the common part code bits, the first set of station specific code bits, and the second set of station specific code bits.

In one aspect a computer-readable non-transitory storage medium is described. The medium contains instructions, which when executed by one or more processors result in performing operations comprising: identifying common part information bits and a first set of station specific information bits corresponding to a first station device and a second set of station specific information bits corresponding to a second station device; concatenating the common part information bits with the first set of station specific information bits; encoding the common part information bits and the first set of station specific information bits in succession to generate common part code bits and a first set of station specific code bits, wherein the first set of station specific code bits terminate in a first plurality of tail bits; concatenating the common part information bits with the second set of station specific information bits; encoding the common part information bits and the second set of station specific information bits in succession to generate a second set of station specific code bits, wherein the second set of station specific code bits terminate in a second plurality of tail bits; and generating a signal field by concatenating the common part code bits, the first set of station specific code bits, and the second set of station specific code bits.

The common part code bits do not include any tail bits. The operations further configured to transmit the signal field as part of a physical layer convergence protocol data unit (PPDU) via the transceiver and the at least one antenna. The operations further configured to identify the first station device based at least in part on receiving a request from the first station devices for a resource allocation.

In one aspect, a method is described, the method comprising: identifying common part information bits and a first set of station specific information bits corresponding to a first station device and a second set of station specific information bits corresponding to a second station device; concatenating the common part information bits with the first set of station specific information bits; encoding the common part information bits and the first set of station specific information bits in succession to generate common part code bits and a first set of station specific code bits, wherein the first set of station specific code bits terminate in a first plurality of tail bits; concatenating the common part information bits with the second set of station specific information bits; encoding the common part information bits and the second set of station specific information bits in succession to generate a second set of station specific code bits, wherein the second set of station specific code bits terminate in a second plurality of tail bits; and generating a signal field by concatenating the common part code bits, the first set of station specific code bits, and the second set of station specific code bits.

The common part code bits do not include any tail bits. The method further comprises transmitting the signal field as part of a physical layer convergence protocol data unit (PPDU) via the transceiver and the at least one antenna. The method further comprises identifying the first station device based at least in part on receiving a request from the first station devices for a resource allocation.

In one aspect, an apparatus is described, the apparatus further comprising: a means to identify common part information bits and a first set of station specific information bits corresponding to a first station device and a second set of station specific information bits corresponding to a second station device; a means to concatenate the common part information bits with the first set of station specific information bits; a means to encode the common part information bits and the first set of station specific information bits in succession to generate common part code bits and a first set of station specific code bits, wherein the first set of station specific code bits terminate in a first plurality of tail bits; a means to concatenate the common part information bits with the second set of station specific information bits; a means to encode the common part information bits and the second set of station specific information bits in succession to generate a second set of station specific code bits, wherein the second set of station specific code bits terminate in a second plurality of tail bits; and a means to generate a signal field by concatenating the common part code bits, the first set of station specific code bits, and the second set of station specific code bits. The common part code bits do not include any tail bits. The apparatus further comprises a means to transmit the signal field as part of a physical layer convergence protocol data unit (PPDU) via the transceiver and the at least one antenna. The apparatus further comprises a means to identify the first station device based at least in part on receiving a request from the first station devices for a resource allocation.

What is claimed is:

1. A computer-readable non-transitory storage medium that contains instructions, which when executed by one or more processors result in performing operations comprising:
receiving a wireless communication preamble structure comprising a high-efficiency signal field, wherein the high-efficiency signal field comprises at least a common part having common part code bits and one or more station device specific parts having corresponding one or more sets of station device specific code bits;
determining the common part code bits;
identifying an identifier of a station device comprising a partial access identifier (PAID);
determining a particular set of station device specific code bits from the one or more sets of station device specific code bits, wherein the determining the particular set of station device specific code bits comprising parsing the one or more sets of station device specific code bits to identify the PAID, and
determining that a defined number of bits following the PAID correspond to the particular set of station device specific code bits;
decoding the common part code bits and the particular set of station device specific code bits, wherein the particular set of station device specific code bits conclude with a plurality of tail bits; and
identifying a resource allocation of the station device based at least in part on the decoded common part code bits, the station device specific code bits, and the identifier of the station device.

2. The computer-readable non-transitory storage medium of claim 1, wherein the wireless communication preamble structure is part of a physical layer convergence protocol data unit (PPDU).

3. The computer-readable non-transitory storage medium of claim 1, wherein decoding the common part code bits and the particular set of station device specific code bits after the common part code bits further comprises:
concatenating the common part code bits and the particular set of station device specific code bits after the common part code bits; and
applying the concatenated common part code bits and the particular set of station device specific code bits to a convolution code decoder, wherein the plurality of tail bits place the convolution code decoder in an ending state to decode further code bits.

4. The computer-readable non-transitory storage medium of claim 1, wherein the common part code bits exclude any tail bits after a last bit of the common part code bits.

5. The computer-readable non-transitory storage medium of claim 1, wherein there is at least a second set of station specific code bits between the common part code bits and the particular set of station specific code bits.

6. The computer-readable non-transitory storage medium of claim 1, wherein the particular set of station device specific code bits include a plurality of cyclic redundancy check (CRC) bits, wherein the plurality of CRC bits are based at least in part on both the common part code bits and the particular set of station device specific code bits.

7. A wireless device, comprising:
at least one antenna configured to transmit and receive wireless signals;
a transceiver device communicatively coupled to the at least one antenna;
at least one memory device that stores computer-executable instructions; and
at least one processor configured to access the at least one memory device, wherein the at least one processor is communicatively coupled to the transceiver device and is configured to execute the computer-executable instructions to:
receive a wireless communication preamble structure comprising a high-efficiency signal field, wherein the high-efficiency signal field comprises at least a common part having common part code bits and one or more station specific parts corresponding to each of one or more sets of station specific code bits, wherein each of the one or more sets of station specific code bits terminate with a plurality of tail bits;
identify a particular set of station specific code bits, wherein the at least one processor is further configured to determine a partial access identifier (PAID) of the wireless device;
parse the one or more sets of station specific code bits to identify the PAID; and
determine that a defined number of bits following the PAID correspond to the particular set of station specific code bits; and
decode the common part code bits and the particular set of station specific code bits in succession, wherein the common part code bits and the particular set of station specific code bits are applied to a convolution code decoder, and wherein a final state of the convolution code decoder after decoding the common part code bits is to be maintained as an initial state of the decoder when decoding the particular set of station specific code bits.

8. The wireless device of claim 7, wherein the at least one processor is further configured to execute the computer-executable instructions to:
identify a resource allocation to the wireless device based at least in part on the decoded common part code bits and the decoded particular set of station specific code bits; and
receive or transmit data according to the resource allocation via the transceiver device and the at least one antenna.

9. The wireless device of claim 7, wherein there is at least a second set of station specific code bits between the common part code bits and the particular set of code bits.

10. A computer-readable non-transitory storage medium that contains instructions, which when executed by one or more processors result in performing operations comprising:
identifying a station device;
identifying resource allocation information of the station device;

determining, based at least in part on the resource allocation information, common part information bits and station device specific information bits;

encoding the common part information bits and the station device specific information bits in succession to generate common part code bits and station device specific code bits of a high-efficiency signal field, the encoding comprising encoding a partial access identifier (PAID) of the station device and a defined number of bits following the PAID, wherein the station device specific code bits include the defined number of bits and terminate with a plurality of tail bits; and generating, based at least in part on the common part code bits and the station device specific code bits, the high-efficiency signal field.

11. The computer-readable non-transitory storage medium of claim 10, wherein the operations further comprise:

incorporating the high-efficiency signal field in a physical layer convergence protocol data unit (PPDU); and initiating, via one or more antennas, transmission of the PPDU.

12. The computer-readable non-transitory storage medium of claim 10, wherein the identifying the station device comprises receiving a request from the station device for the resource allocation information.

13. The computer-readable non-transitory storage medium of claim 10, wherein the common part code bits exclude any tail bits after a last bit of the common part code bits.

14. The computer-readable non-transitory storage medium of claim 10, wherein the station device is a first station device, the resource allocation information is a first resource allocation information, the station device specific information bits are part of a first set of station specific information bits, the station device specific code bits are part of a first set of station specific code bits, and the plurality of tail bits are a first plurality of tail bits, and wherein the operations further comprise:

identifying a second station device and second resource allocation information of the second station device;

determining, based at least in part on the resource allocation information, a second set of station specific information bits; and encoding the common part information bits and the second set of station specific information bits in succession to generate a second set of station specific code bits of a high-efficiency signal field, wherein the second set of station specific code bits correspond to the second set of station specific information bits and the second set of station specific code bits terminate with a second plurality of tail bits, wherein generating the high-efficiency signal field comprises concatenating, in order, the common part code bits, the first set of station specific code bits, and the second set of station specific code bits.

15. A wireless access point device, comprising:

at least one antenna configured to transmit and receive wireless signals;

a transceiver communicatively coupled to the at least one antenna;

at least one memory that stores computer-executable instructions; and at least one processor configured to access the at least one memory, wherein the at least one processor is communicatively coupled to the transceiver and is configured to execute the computer-executable instructions to:

identify common part information bits and a first set of station specific information bits corresponding to a first station device and a second set of station specific information bits corresponding to a second station device, the first set of station specific information bits comprising a first partial access identifier (PAID) of the first station device and a first defined number of bits following the first PAID;

concatenate the common part information bits with the first set of station specific information bits;

encode the common part information bits and the first set of station specific information bits in succession to generate common part code bits and a first set of station specific code bits, wherein the first set of station specific code bits terminate in a first plurality of tail bits;

concatenate the common part information bits with the second set of station specific information bits;

encode the common part information bits and the second set of station specific information bits in succession to generate a second set of station specific code bits, wherein the second set of station specific code bits terminate in a second plurality of tail bits; and generate a signal field by concatenating the common part code bits, the first set of station specific code bits, and the second set of station specific code bits.

16. The wireless access point device of claim 15, wherein the common part code bits exclude any tail bits after a last bit of the common part code bits.

17. The wireless access point device of claim 15, wherein the at least one processor is further configured to transmit the signal field as part of a physical layer convergence protocol data unit (PPDU) via the transceiver and the at least one antenna.

18. The wireless access point device of claim 15, wherein the at least one processor is further configured to identify the first station device based at least in part on receiving a request from the first station device for a resource allocation.

* * * * *